United States Patent
Sutor et al.

(10) Patent No.: US 12,450,343 B1
(45) Date of Patent: Oct. 21, 2025

(54) SYNCHRONIZED TASK MANAGEMENT FOR A SECURITY SYSTEM

(71) Applicant: Genetec Inc., Montréal (CA)

(72) Inventors: Stephan Sutor, Vienna (AT); Klemens Kraus, Vienna (AT); Sigurd Decroos, Oudenburg (BE)

(73) Assignee: Genetec Inc., Montreal (CA)

( * ) Notice: Subject to any disclaimer, the term of this patent is extended or adjusted under 35 U.S.C. 154(b) by 0 days.

(21) Appl. No.: 18/932,272

(22) Filed: Oct. 30, 2024

(51) Int. Cl.
*G06F 21/55* (2013.01)

(52) U.S. Cl.
CPC .... *G06F 21/554* (2013.01); *G06F 2221/2111* (2013.01); *G06F 2221/2151* (2013.01)

(58) Field of Classification Search
None
See application file for complete search history.

(56) References Cited

U.S. PATENT DOCUMENTS

| | | | | |
|---|---|---|---|---|
| 2019/0311451 A1* | 10/2019 | Laycock | ........... | G06V 20/41 |
| 2020/0250299 A1* | 8/2020 | Peacock | ........... | G06F 21/51 |
| 2020/0252430 A1* | 8/2020 | Peacock | ........... | H04W 12/63 |
| 2024/0007523 A1* | 1/2024 | Saxena | ........... | H04L 9/14 |
| 2025/0008060 A1* | 1/2025 | Singla | ........... | H04N 7/188 |

\* cited by examiner

*Primary Examiner* — Joseph P Hirl
*Assistant Examiner* — Hassan Saadoun
(74) *Attorney, Agent, or Firm* — Husch Blackwell LLP

(57) ABSTRACT

A security system managing at least one security device adapted to generate security data, the security system comprising a computing system. The computing system adapted receive security data corresponding to the at least one security device, cause display of the security data within a first window on a first display, detect a user interaction with the security data displayed within the first window, generate an incident card in response to detecting the user interaction, add the incident card to a task management queue, and cause display of the incident card within the task management queue, the task management queue displayed within at least one of a second window on the first display or a third window on a second display.

12 Claims, 23 Drawing Sheets

Incident Card 324

Information Fields 402
- Type of Incident: Break-In
- Time of Incident: 11:31:29
- Security Device: Security Camera 104-B
- Location: Building C
- Date of Incident: 10/1/2024
- Urgency of Incident: High Task 404

Task Fields 406
- Progress: 33% Complete
- Resources:
  - 2 Security Guards
  - 2 Maintenance Technicians
  - New security camera
  - New Window
- Actions:
  - Secure Scene
  - Repair Damaged Window
  - Replace Damaged Security Camera 104-B

FIG. 4

SYNCHRONIZED TASK MANAGEMENT FOR A SECURITY SYSTEM

FIELD

These present teachings relate generally to security systems and, more particularly, to systems and methods for synchronized task management for a security system.

BACKGROUND

Security systems, which can include a variety of security devices such as surveillance cameras, access controls, motion sensors, and/or alarms, are commonly used to monitor and/or restrict access to areas. In operation, as the security devices included in a security system generate security data, an occurrence of an incident may be captured in the security data generated by one or more of the security devices. For example, incidents such as, but not limited to, an attempted break-in, a car accident, or an environmental hazard, may be captured in the security data generated by one or more security devices included in the security system.

Typically, an operator monitors feeds of security data that are being generated by the security devices included in the security system. As the operator monitors a security data feed, the operator may determine that incident has occurred. In response to determining that an incident has occurred, the operator may then notify one or more parties responsible for responding to the incident.

Oftentimes, an adequate response to an incident detected through use of a security system requires a coordinated effort between various parties and/or resources. For example, an incident such as a break-in attempt may require resources from a police department for securing the area surrounding the break-in attempt, resources from a maintenance department for repairing damage to the area involved in the break-in attempt, and even emergency medicine resources for treating and/or transporting victims involved in the break-in attempt.

However, conventional approaches to responding to incidents that are detected using security systems lack the synchronization necessary for coordinating and effectively tracking a complete response to the incident. In that regard, it would be beneficial to have an alternative system and method for managing tasks in a security system.

SUMMARY

The needs set forth herein as well as further and other needs and advantages are addressed by the present embodiments, which illustrate solutions and advantages described below.

The present teachings relate to synchronizing task management for a security system. In particular, the present teachings relate to synchronizing in real-time the generation, modification, and/or deletion of tasks in a first software application running a first computing system associated with the security system with one or more second software applications running on one or more other computing devices associated with security system.

At least one technical advantage of the present teachings relative to existing solutions is that, with the present teachings, tracking the progress towards the completion of tasks performed in response to an incident can be synchronized across various software environments and/or computing devices. In that regard, as parties responsible for responding to the incident may use different types of software applications to assign and/or monitor tasks, the synchronization between the various software applications can prevent the different parties from duplicating work thereby reducing the amount of time and resources required to effectively respond to an incident.

One embodiment according to the present teachings includes, but is not limited to, a security system managing at least one security device adapted to generate security data comprises a computing system. The computing system adapted to receive security data corresponding to the at least one security device, cause display of the security data within a first window on a first display, detect a user interaction with the security data displayed within the first window, generate an incident card in response to detecting the user interaction, add the incident card to a task management queue, and cause display of the incident card within the task management queue, the task management queue displayed within at least one of a second window on the first display or a third window on a second display.

Another embodiment according to the present teachings includes, but is not limited to, a security system managing at least one security device adapted to generate security data comprises a first computing system and a second computing system in electronic communication with the first computing system. The first computing system including a first processor and a display with a user interface, the second computing system including a second processor. The first computing system adapted to receive security data corresponding to the at least one security device, display the security data within a user interface on the display, detect a user interaction with the security data displayed within the user interface, generate an incident card in response to detecting the user interaction with the security data, populate the incident card with first information associated with the security data, prompt a user to input second information associated with the security data, populate the incident card with the second information in response to receiving the second information from the user, and transmit the incident card to the second computing system. The second computing system adapted to receive the incident card and add the incident card to a task management queue.

Another embodiment according to the present teachings includes, but is not limited to, a security system comprising a security camera adapted to generate video content and a computing system in electronic communication with the security camera via a network. The computing system adapted to receive the video content generated by the security camera, display the video content within a user interface on a display, receive a request to generate an incident card associated with the video content while the video content is displayed within the user interface, generate an incident card based on the request to generate the incident card, and populate the incident card in a task management platform.

Another embodiment according to the present teachings includes, but is not limited to, a security system managing at least one security device adapted to generate security data comprises a computing system. The computing system adapted to receive security data corresponding to the at least one security device, detect an occurrence of an event associated with the security data, generate an incident card in response to detecting the occurrence of the event, the incident card describing a task to be performed by one or more personnel, add the incident card to a task management queue, and cause display of the incident card within the task management queue within a window on a display.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

BRIEF DESCRIPTION OF THE DRAWINGS

FIG. 4 is a block diagram of an incident card, according to the present teachings.

DETAILED DESCRIPTION

Figure 1:
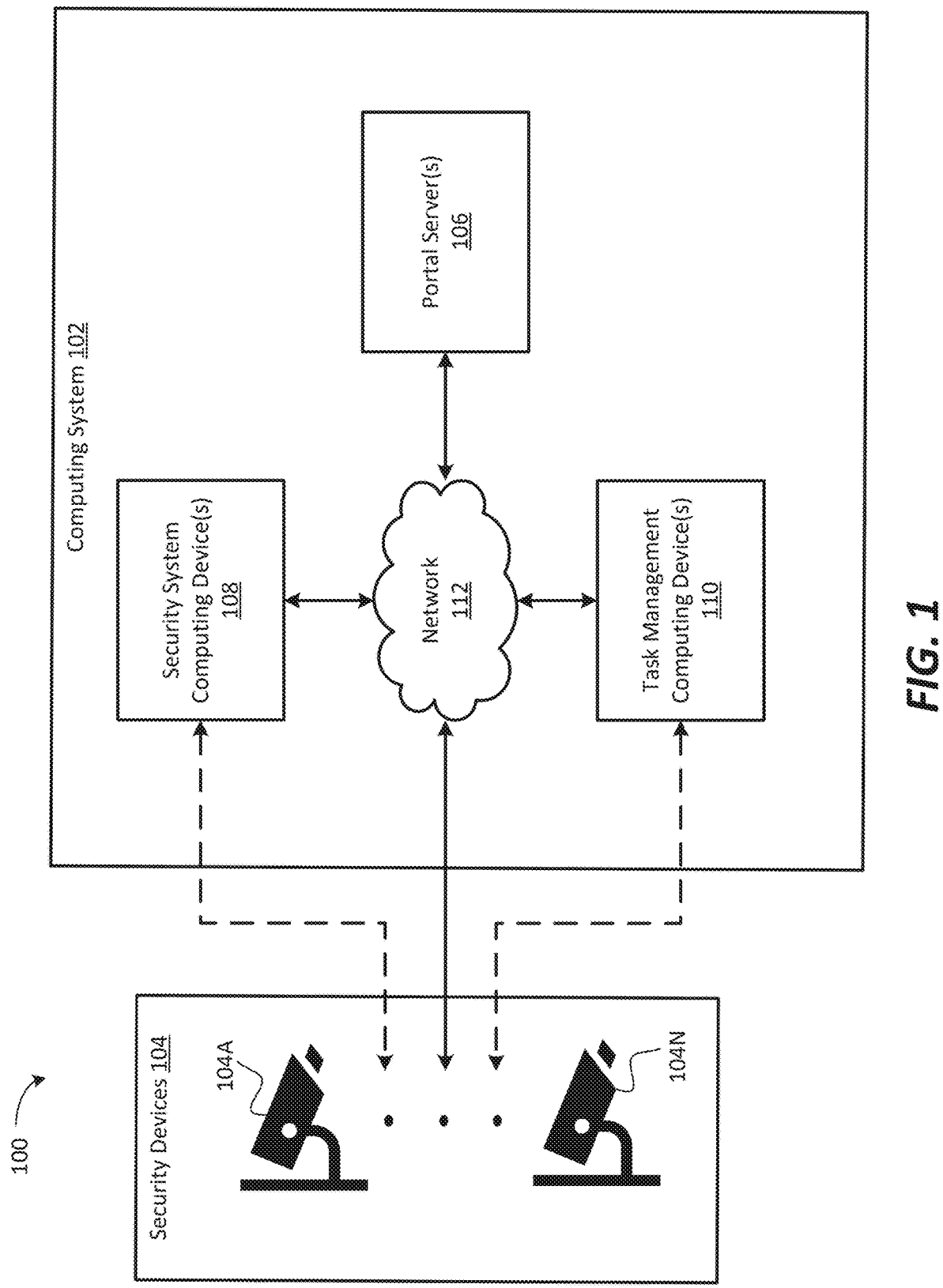
FIG. 1 is an illustration of an example security system, according to the present teachings.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

A "computing system" may provide functionality for the present teachings. The computing system may include software executing on computer readable media that may be logically (but not necessarily physically) identified for particular functionality (e.g., functional modules). The computing system may include any number of computers/processors, which may communicate with each other over a network. The computing system may be in electronic communication with a datastore (e.g., database) that stores control and data information. Forms of computer readable media include, but are not limited to, disks, hard drives, random access memory, programmable read only memory, or any other medium from which a computer can read.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of a patent issued on this application in interpreting the claims appended hereto, it is noted that none of the appended claims or claim elements are intended to invoke 35 U.S.C. 112(f) unless the words "means for" or "step for" are explicitly used in the particular claim.

Recitations of numerical ranges by endpoints include all numbers within that range (e.g., 1 to 5 includes 1, 1.5, 2, 2.75, 3, 3.80, 4, 5, etc.). Where a range of values is "greater than", "less than", etc., of a particular value, that value is included within the range.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles, or systems described herein may be used in a number of directions and orientations.

Any citation to a reference in this disclosure or during the prosecution thereof is made out of an abundance of caution. No citation (whether in an Information Disclosure Statement or otherwise) should be construed as an admission that the cited reference qualifies as prior art or comes from an area that is analogous or directly applicable to the present teachings.

Referring now to FIG. 1, shown is an example security system 100, according to the present teachings. As shown, the security system 100 includes a computing system 102 that is in electronic communication with a plurality of security devices 104 that generate security data. The computing system 102 may include any number of computers/processors, which may communicate with each other over a network and rely on distributed computing resources. In some examples, the computing system 102 may be in the form of one or more servers.

In the illustrated example of FIG. 1, the computing system 102 includes one or more portal servers 106, one or more security system computing devices 108, and one or more task management computing devices 110, each of which are connected via a communications network 112. In the following description, the one or more portal servers 106 may be collectively referred to as a portal server 106, the one or more security system computing devices 108 may be collectively referred to as a security system computing device 108, and the one or more task management computing devices 110 may be collectively referred to as a task management computing device 110.

In the illustrated example of FIG. 1, the security devices 104 are shown as surveillance cameras that generate video content. However, the security system 100 can include various types of security devices other than surveillance cameras. For example, the security devices 104 can be implemented as one or more of surveillance cameras (including license plate recognition cameras), motion sensors, alarms, access controls (e.g., door locks), and/or any other suitable type of security device. In the following description, the plurality of security devices 104 be collectively referred to as a security device 104. In some examples, mobile computing devices such as smartphones, tablets, or wearable devices can be implemented as security devices 104, as these mobile computing devices may contain cameras, microphones, and/or other sensors that can be used to generate security data.

In some examples, the security devices 104 can be implemented as one or more monitoring and/or alarm devices installed in vehicles, such as fleet vehicles (e.g., transit buses, school buses, trucks, etc.), first responder vehicles (e.g., police cars, fire trucks, ambulances, etc.), and/or other types of vehicles (e.g., drones), as computer systems controlling one or more security devices 104 (e.g., a computer aided dispatch (CAD) system or a records system), or the like. In such examples, the monitoring and/or alarm devices can include collision sensors, accelerometers, motion sensors, anti-theft alarms, cameras, and/or other types of monitoring and/or alarm devices.

One or more of the security devices 104 may be connected to the computing system 102 via the communications network 112. For example, a security device 104 can be connected to one or more of the portal server 106, the security system computing device 108, and/or the task management computing device 110 via the communications network 112. In some examples, the security system computing device 108 can be connected directly to one or more security devices 104, for example via a wired connection, without using the communications network 112.

The communications network 112 can be, for example, a combination of one or more of a wide area network (WAN) (e.g., the Internet, a TCP/IP based network, a cellular network, such as, for example, a Global System for Mobile Communications [GSM] network, a General Packet Radio Services [GPRS] network, a Code Division Multiple Access [CDMA] network, an Evolution-Data Optimized [EV-DO] network, an Enhanced Data Rates for GSM Evolution [EDGE] network, a 3 GSM network, a 4GSM network, a Digital Enhanced Cordless Telecommunications [DECT] network, a Digital AMPS [IS-136/TDMA] network, or an Integrated Digital Enhanced Network [iDEN] network, etc.), a local area network (LAN), a neighborhood area network (NAN), a home area network (HAN), and/or a personal area network (PAN) employing any of a variety of communications protocols, such as Wi-Fi, Bluetooth, ZigBee, etc.

During operation of the security system 100, the security devices 104 generate security data and transmit the security data to one or more of the portal server 106, the security system computing device 108, and/or the task management computing device 110. For example, a security device 104 that is implemented as a surveillance camera may generate and transmit video content to the portal server 106 or the security system computing device 108. As another example, a security device 104 that is implemented as an access control may generate and transmit data associated with door openings and closings to the portal server 106 and/or the security system computing device 108. In some examples, a security device 104 can transmit security data directly to the portal server 106 via the communications network 112. In other examples, a security device 104 can transmit security data to the portal server 106 indirectly through one or more intermediary devices, such as a security system computing device 108, a task management computing device 110, and/or one or more other network access points and/or nodes.

The portal server 106 can be implemented as one or more frontend servers, backend servers, and/or other remote servers adapted to provide cloud-based services (e.g., software as a server (SaaS)), or portals, to the computing system 102. As will be described in more detail herein, with the cloud-based services hosted on the portal server 106, client computing devices included in the computing system 102 (e.g., the security system computing device 108, the task management computing device 110, etc.) can access the security system 100, manage resources and/or tasks associated with the security system 100, and/or synchronize changes to data elements and/or structures that are shared across multiple local and/or web-based applications implemented by the computing system 102.

In some examples, the portal server 106 can implement a security system portal through which third-party entities (e.g., first responders, dispatchers, integrators, etc.) and/or end users of the security system 100 (e.g., owners, employees, property managers, security personnel, etc.) can access and/or manage operation of the security system 100. For example, third-party entities and/or end users of the security system 100 can use a security system computing device 108 to access and/or manage operation of the security system 100. As will be described in more detail herein, accessing and/or managing operation of the security system 100 through the security system portal can include, without limitation, viewing security data that was generated by the security devices 104 and stored in the portal server 106, uploading security data that was generated by a security device 104 from a computing device (e.g., security system computing device 108) to the portal server 106, generating incident cards associated with security data generated by a security device 104, creating tasks to be performed in relation to an incident and/or event associated security data generated by a security device 104, tracking and viewing progress towards completion of tasks performed in relation to incidents and/or events, and/or various other management and control features associated with the security system 100.

As used herein, the term "incident card" refers to a data structure that is associated with an event, or incident, that has occurred. In some examples, the incident is a public safety incident including, without limitation, an occurrence of emergency event (e.g., fires, school lockdowns, attempted break-ins, burglaries, etc.), presence of a safety hazard, a collision involving one or more vehicles, an altercation between one or more persons, placement of an emergency phone call, damage to one or more security devices 104 included in the security system, damage to one or more objects and/or property associated with owners and/or operators of the security system 100, and/or some other type of event. In some examples, the incident with which the incident card is associated is captured in the security data generated by one or more of the security devices 104. In such examples, the incident card can be generated by the security system portal implemented on the portal server 106 and/or a security system computing device 108 connected to the security system portal following detection of the incident occurring within the security data.

While the above examples refer to incidents as being relatively grave or serious events, incidents can also refer to relatively mundane events or occurrences. For example, incidents can refer to mundane events such as a door being left open, a network cable being unplugged, a liquid being spilled, or some other mundane occurrence or event. Moreover, incident cards may be generated in association with relatively mundane incidents.

As will be described in more detail herein, an incident card contains information pertaining to the incident with which the incident card is associated. For example, an incident card can include, without limitation, information that identifies the type of incident that has occurred, a type and/or location of a security device 104 that generated the security data associated with the incident, a time at which the incident occurred (e.g., a timestamp indicative of the time at which the incident occurred within the security data), a location at which the incident occurred, an urgency associated with the incident, one or more resources (e.g., first responders, maintenance personnel, vehicles, tools, replacement parts, etc.) associated with the incident, and/or other identifying information associated with the incident. In some examples, the security system portal can automatically populate the incident card with identifying information when the incident card is generated. In other examples, a user of the security system computing device 108 can be prompted to populate the incident card with identifying information. In such examples, a user of the security system computing device 108 can populate the incident card with identifying information.

In some examples, the incident card further includes information that identifies a task to be performed in relation to the incident. A task to be performed in relation to the incident can include, for example, one or more actions to be performed in response to detection and/or the occurrence of the incident. Information that identifies the task to be performed can include description of one or more actions that are to be performed, one or more resources that are needed to implement the one or more actions to be performed, one or more resources that are currently assigned to the task and/or incident, one or more locations at which the actions are to be performed, a timeline for completing the one or more actions, an amount of progress made towards completion of the task (e.g., a list of actions that have already been completed to perform the task, a list of one or more actions that still need to be completed to perform the task, etc.), relationships with one or more other incident cards, various categorizations (e.g., tags), a narrative or list of comments and/or reports, and/or other information associated with the task. As used herein, the term "resources" can refer to both human (e.g., maintenance personnel, first responders, etc.) and non-human (e.g., vehicles, tools, replacement parts, etc.) resources that can be used to perform one or more actions for completing the task. In some examples, resources can be assigned to a task by generating an incident card and/or modifying an incident card to specify the one or more resources to be assigned to the task. For example, a user of the security system computing device 108 and/or the task management computing device 110 can access the security system portal to assign resources to a task described in an incident card.

In addition to implementing a security system portal, in some examples, the portal server 106 can also implement a task management portal through which third-party entities (e.g., first responders, dispatchers, maintenance personnel, etc.) and/or end users of the security system 100 (e.g., owners, employees, property management, security personnel, etc.) can create, modify, assign, and/or monitor progress towards completion of tasks. In some examples, the task management portal uses one or more task management queues for organizing and/or tracking the progress made towards completing various tasks. For example, the task management portal can use one or more task management queues for organizing tasks associated with the security system 100, one or more task management queues for organizing tasks that are not associated with the security system 100, and/or one or more task management queues for organizing both tasks that are associated with the security system 100 and tasks that are not associated with the security system 100.

In some examples, tasks are added to and/or stored in a task management queue in the form of incident cards. In such examples, when a new incident card is generated, the incident card can be added to a task management queue in accordance with the task described in the incident card. For example, the incident card can be added to a position in the task management queue based on one or more of a timeline for completing the task described in the incident card, an urgency associated with the task described in the incident card, the type of incident associated with the incident card, the amount and/or type of resources assigned to the task described in the incident card, and/or based on some other characteristic of the incident card.

In some examples, there are multiple task management queues. In such examples, an incident card can be added to and/or stored in a select one of the task management queues or multiple task management queues. As described in more detail herein, in some examples, incident cards stored in one task management queue can be moved to one or more other task management queues.

Through the task management portal, users such as third-party entities (e.g., first responders, dispatchers, maintenance personnel, etc.) and/or end users of the security system 100 (e.g., owners, employees, property managers, security personnel, etc.) can create new incident cards to be added to a task management queue, modify incident cards currently stored in a task management queue, assign one or more resources to incident cards currently stored in a task management queue, and/or monitor progress towards completion of the tasks described in the incident cards stored in a task management queue. For example, a user can use a task management computing device 110 connected to the portal server 106 to perform one or more of the task management actions described herein. In some examples, a user of the task management computing device 110 can update an incident card after completing one or more actions associated with the task described in the incident, can remove an incident card from the task management queue after completing the task associated with the incident card, can view the incident card to determine an amount of progress that has been made towards completing the task described in the incident card, can adjust the position within a task management queue of a particular incident card, can contact (e.g., transmit notification and/or messages to) one or more personnel associated with an incident card stored in a task management queue, and/or can modify and/or update other information included in an incident card stored in a task management queue.

In some examples, the task management portal and the security system portal are integrated within a single portal hosted by the portal server 106. In some examples, the portal server 106 can implement the task management portal in conjunction with the security system portal. In such examples, the task management portal can add incident cards generated using the security system portal to one or more task management queues. In that regard, when a user creates a new incident card using a security system computing device 108 that is connected to the security system portal, the task management portal can be used to add that incident card to a task management queue. Furthermore, the task management portal can be used to view, make changes and/or updates to, assign, and/or delete incident cards that were generated using the security system portal. For example, when a user creates a new incident card using a security system computing device 108 that is connected to the security system portal, the task management portal can be used to view that incident card, make changes and/or updates to that incident card, assign resources to that incident card, and/or delete that incident card.

Importantly, when implemented in conjunction with the security system server, any modifications made to an incident card using the task management portal can be synchronized with the security system portal. In that regard, as users use the task management portal (e.g., via a task management computing device 110) to modify an incident card stored in a task management queue, these modifications will be implemented and made visible, in real-time, to users using the security system portal (e.g., via the security system computing device 108) to view that same incident card. Likewise, as users use the security system portal (e.g., via the security system computing device 108) to generate new incident cards and/or modify existing incident cards, these newly generated incident cards and/or modifications to the existing incident cards will be reflected in real-time as users of the task management portal view (e.g., via the task management computing device 110) one or more incident cards in the task management queue.

Further in addition to implementing a security system portal and/or a task management portal, in some examples, the portal server 106 can also implement a map view portal through which third-party entities (e.g., first responders, dispatchers, maintenance personnel, etc.) and/or end users of the security system 100 (e.g., owners, employees, property managers, security personnel, etc.) can view an interactive map of an area associated with the security system 100 and/or an area surrounding the premises on which the security system 100 is implemented. For example, users of a security system computing device 108 and/or a task management computing device 110 can connect to the map view portal to view the interactive map.

In some examples, the map view portal can receive third-party data, for example from dispatcher and/or first responder systems, and cause the display of representations of the third-party data within the interactive map on a display device in the computing system 102 (e.g., on a display of the security system computing device 108, on a display of the task management computing device 110, or some other display device in the computing system 102). For example, the map view portal can cause display of an icon and/or other symbol within the interactive map at location that corresponds to an emergency call placed to a dispatcher. As another example, the map view portal can cause display of an icon representing a first responder vehicle, such as an ambulance, as it moves through the area associated with the security system 100 and/or an area surrounding the premises on which the security system 100 is implemented.

In some examples, the map view portal can be implemented in conjunction with and/or integrated within the security system portal and/or the task management portal. In such examples, the map view portal can further be used to cause display of incident cards within the interactive map. In that regard, the map view portal can retrieve an incident card from the security system portal and/or the task management portal and cause display of the incident card within the interactive map on a display device in the computing system 102 (e.g., on a display of the security system computing device 108, on a display of the task management computing device 110, or some other display device in the computing system 102). For example, the map view portal can cause display of an incident card at a location within the interactive map that corresponds to the real world location at which the incident associated with the incident card occurred.

While an incident card is displayed within the interactive map on a computing device (e.g., on a display of the security system computing device 108 or the task management computing device 110), a user of the computing device can interact with the incident card. Interacting with an incident card displayed within the interactive map can include, for example, viewing the information included in the incident card, modifying information included in the incident card, assigning one or more resources to perform a task included in the incident card, and/or some other action associated with the incident card. Importantly, when implemented in conjunction with the security system portal and/or the task management portal, any modifications made to an incident card that is displayed within the interactive map can be synchronized with the security system portal and/or the task management queue. In that regard, as users modify an incident card displayed within the interactive map, the modifications made to the incident card will be implemented and made visible in real-time to users of security system portal and/or users of the task management portal. Likewise, as users use the security system portal and/or the task management portal to generate new incident cards and/or modify existing incident cards, these newly generated incident cards and/or modifications to the existing incident cards will be reflected in real-time on the interactive map.

In some examples, the map view portal can further be used to cause the display of resources associated with the security system 100 and/or third-party resources within the interactive map. For example, the map view portal can retrieve data associated with one or more resources (e.g., from the security system portal, from the task management portal, and/or from a third-party system) and, based on the retrieved data, cause the display of the one or more resources within the interactive map on a display device in the computing system 102 (e.g., on a display of the security system computing device 108, on a display of the task management computing device 110, or some other display device in the computing system 102). In some examples, users can interact with a resource displayed within the interactive map to assign the resource to an incident card that is also displayed within the interactive map.

Figure 2:
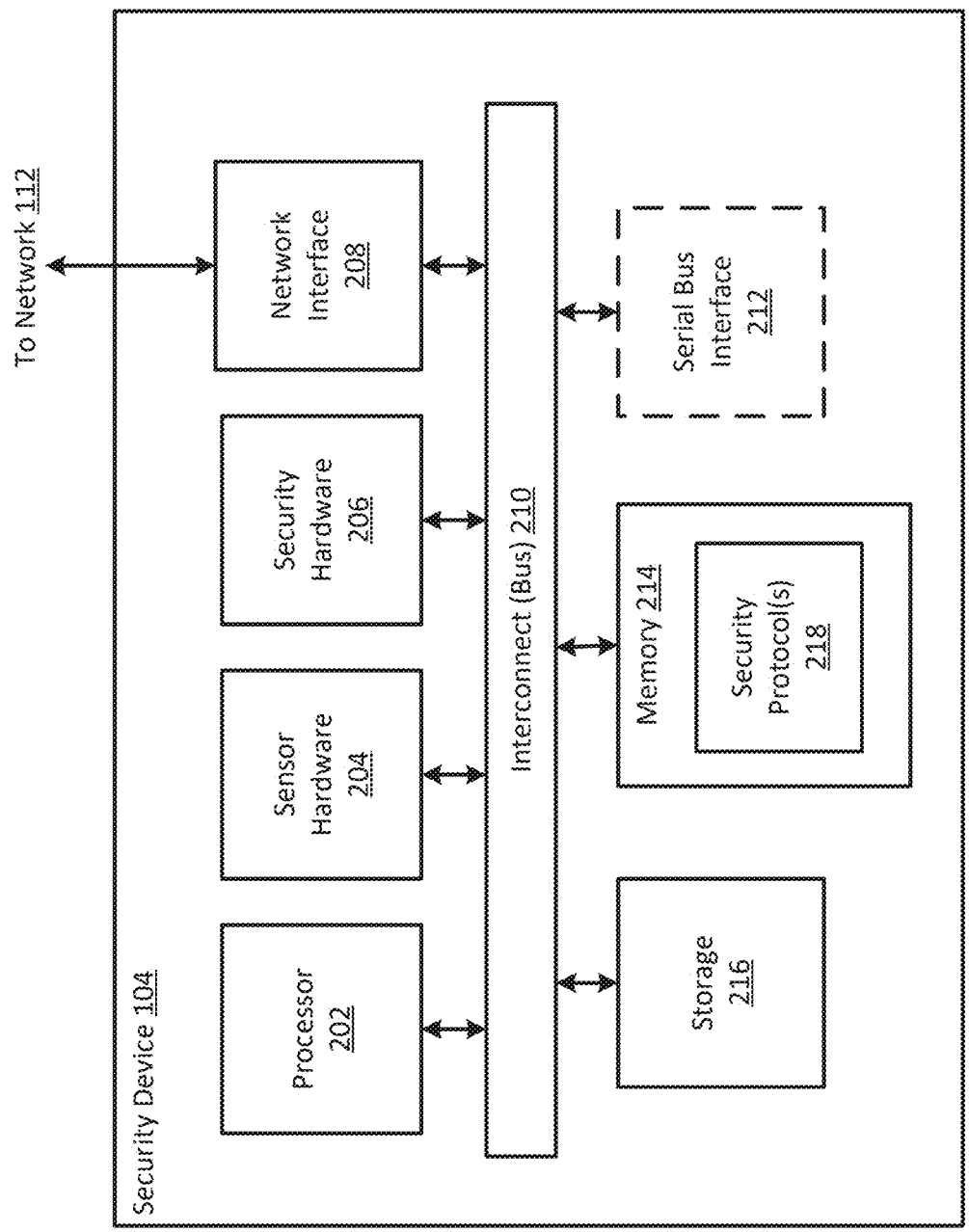
FIG. 2 is a block diagram of a security device that may be implemented in conjunction with a security system, according to the present teachings.

FIG. 2 is a block diagram of a security device 104 that may be implemented in conjunction with the computing system 102, according to present teachings. As shown, the security device 104 may include, without limitation, a processor 202, sensor hardware 204, security hardware 206, a network interface 208, an interconnect 210, a serial bus interface 212, memory 214, and storage 216. The interconnect, or bus, 210 can include one or more wires, cables, traces, contacts, analog components, digital components, wireless connection components, or other suitable means for interconnecting hardware components of the security device 104.

The sensor hardware 204 can include, without limitation, one or more of an image sensor, an audio sensor, a motion sensor, an RFID sensor, a barcode reader, and/or some other suitable sensing means. The security hardware 206 can include one or more actuators, motors, linkages, and/or other mechanisms associated with operation of the security device 104. For example, if the security device 104 is implemented as a surveillance camera, the security hardware can include an actuator used for rotating the camera and/or mechanisms used for adjusting the field of view of the camera. As another example, if the security device 104 is implemented as an access control, the security hardware 206 can include one or more actuators and mechanisms used for locking and unlocking a door.

The processor 202 is adapted to control the security device 104 (e.g., the sensor hardware 204 and/or the security hardware 206) to operate and generate security data in accordance with one or more security protocols 218 included in the memory 214 and/or the storage 216. For an example in which the security device 104 is a surveillance camera, the processor 202 controls the security device 104 to generate security data, such as video content, in accordance with the security protocols 218. For an example in which the security device 104 is an access control, the processor 202 controls the security device 104 to lock and unlock doors in accordance with the security protocols 218. In this example, the processor 202 further controls the security device 104 to generate security data, such as data indicative of times at which the door was locked and/or unlocked or data that identifies users who locked and/or unlocked the door, in accordance with the security protocols 218.

The processor 202 is further adapted to cause security data to be transmitted to the portal server 106 and/or the security system computing device 108, for instance via the network interface 208 and/or the serial bus interface 212. For example, the processor 202 uses the network interface 208 to transmit security data directly to the portal server 106 and/or the security system computing device 108 via the communications network 112. As another example, the processor 202 uses the network interface 208 to transmit security data to the portal server 106 indirectly via one or more intermediary devices, such as the security system computing device 108 and/or the end user computing device 110.

Figure 3:
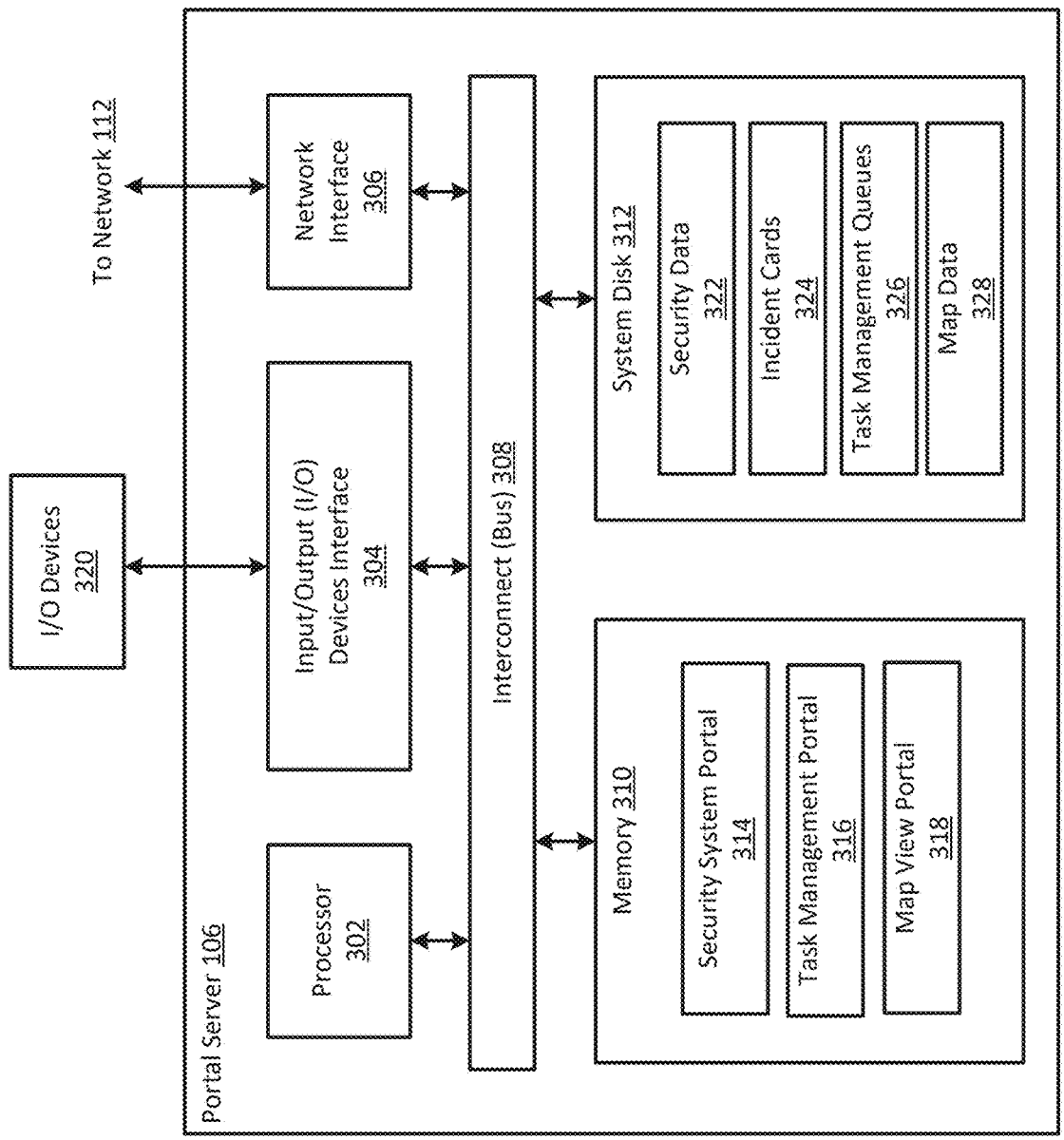
FIG. 3 is a block diagram of a portal server that may be implemented in conjunction with a computing system, according to the present teachings.

FIG. 3 is a block diagram of a portal server 106 that may be implemented in conjunction with the computing system 102, according to present teachings. As shown in FIG. 3, the portal system server 106 includes, without limitation, a processor 302, an input/output (I/O) devices interface 304, a network interface 306, an interconnect 308, a system memory 310, and a system disk 312. The interconnect, or bus, 308 can include one or more wires, cables, traces, contacts, analog components, digital components, wireless connection components, and/or other suitable means for interconnecting hardware components of the portal server 106.

The processor 302 is adapted to retrieve and execute programming instructions, such as the security system portal 314, the task management portal 316, and/or the map view portal 318. Similarly, the processor 302 is adapted to store application data in (e.g., software libraries) and retrieve application data from the system memory 310. The interconnect 308 is adapted to facilitate transmission of data, such as programming instructions and application data, between the processor 302, the I/O devices interface 304, the network interface 306, the system memory 310, and the system disk 312. The I/O devices interface 304 is adapted to receive input data from I/O devices 320 and transmit the input data to the processor 302 via the interconnect 308. For example, I/O devices 320 may include one or more buttons, a keyboard, a mouse, and/or other input devices. The I/O devices interface 304 is further adapted to receive output data from the processor 302 via the interconnect 308 and transmit the output data to the I/O devices 320.

The system disk 312 may include one or more hard disk drives, solid state storage devices, or similar storage devices. The system disk 312 is adapted to store non-volatile data such as files (e.g., audio files, video files, subtitles, application files, software libraries, etc.). For example, the system disk 312 is adapted to store security data 320 generated by security devices 104 in the security system 100. The system disk 312 is further adapted to store one or more incident cards 324, one or more task management queues 326, and/or map data 328.

The system memory 310 includes software instructions for running the security system portal 314 described herein. The security system portal 314 can receive security data 322 generated by one or more security devices 104 in the security system 100 and store the security data 322 in system disk 312. The security system portal 314 can also communicate with and remotely control the security devices 104 included in the security system 100. Furthermore, the security system portal 314 can be used to implement any of the functions described as being performed by the security system portal with respect to FIG. 1. For example, the security system portal 314 can be used to generate new incident cards 324, populate incident cards 324 with information, modify incident cards 324, assign resources to a task described in an incident card 324, contact personnel associated with an incident card 324, and/or any other action described as being performed by the security system portal with respect to FIG. 1.

In some examples, the security system portal 314 is implemented as a cloud-based service that provides an interface through which users of computing devices (e.g., security system computing device 108, task management computing device 110, etc.) in the computing system 102 can access the security data 322 stored in the system disk 312. Moreover, as will be described in more detail herein, security system computing devices 108 and/or task management computing devices 110 can be used to connect to the security system portal 314 and perform one or more of the actions described herein with respect to generation and/or modification of incident cards 324. For example, a user can connect to the security system portal 314 via the security system computing device 108 and use the security system computing device 108 to view security data 322, generate incident cards 324 associated with the security data 322, modify incident cards 324, and/or perform other actions associated with the incident cards 324 as described herein. In some examples, the security system portal 314 can automatically detect an occurrence of an incident associated with the security data 322 received from a security device 104. In such examples, the security system portal 314 can automatically generate an incident card 324 associated with the incident without user intervention and/or user action (e.g., without using a security system computing device 108 and/or a task management computing device 110), or can generate a tentative incident card and solicit user confirmation to generate the incident card 324. Moreover, in some examples, the security system portal 314 can synchronize changes to and/or generation of new incident cards 324 with the task management portal 316 and/or the map view portal 318.

In some examples, the security system portal 314 is integrated within the task management portal 316 and/or the map view portal 318. In some examples, the security system portal 314 is not implemented as a cloud-based service. In such examples, the security system portal 314 may simply be implemented as a remote database for storing security data 322 and/or incident cards 324.

The system memory 310 further includes software instructions for running the task management portal 316 described herein. The task management portal 316 can be used to implement any of the functions described as being performed by the task management portal with respect to FIG. 1. For example, the task management portal 316 can be used to manage tasks described in the incident cards 324 using one or more task management queues 326. Moreover, the task management portal 316 can be used to generate new incident cards 324, populate incident cards 324 with information, modify incident cards 324, assign resources to a task described in an incident card 324, contact personnel associated with an incident card 324, add incident cards 324 generated using the security system portal 316 to a task management queue 326, add incident cards generated using the map view portal 318 to a task management queue 326, arrange the position of an incident card 324 in a task management queue 326 according to one or more characteristics of the incident card 324 and/or the task described in the incident card 324, and/or any other action described as being performed by the task management portal with respect to FIG. 1.

In some examples, the task management portal 316 is implemented as a cloud-based service that provides an interface through which users of computing devices (e.g., security system computing device 108, task management computing device 110, etc.) in the computing system 102 can generate new incident cards 324, add incident cards 324 to a task management queue 326, monitor progress towards completion of tasks described in incident cards 324 stored in task management queues 326, synchronize changes to and/or generation of new incident cards 324 with the security system portal 314 and/or the map view portal 318, and/or perform other actions associated with the incident cards 324 and task management queues 326 as described herein. In some examples, the task management portal 316 can automatically add an incident card 324 to a task management queue 326. For example, the task management portal 316 can automatically add an incident card 324 to a task management queue 326 in response to the incident card 324 being generated using the security system portal 314, the task management portal 316, and/or the map view portal 318. In other examples, the task management portal 316 can add an incident card 324 to a task management queue 326 in response to a user action made via the security system computing device 108 and/or the task management computing device 110.

In some examples, the task management portal 316 is integrated with the security system portal 314 and/or the map view portal 318. In some examples, the task management portal 316 is not implemented as a cloud-based service. In such examples, the task management portal 316 may simply be implemented as a remote database for storing incident cards 324 and/or task management queues 326.

The system memory 310 further includes software instructions for running the map view portal 318 described herein. The map view portal 318 can be used to implement any of the functions described as being performed by the map view portal with respect to FIG. 1. For example, the map view portal 318 can be used to cause display of an interactive map on a display of a computing device included in the computing system 102 (e.g., the security system computing device 108, the task management computing device 110, etc.) Moreover, in causing display of the interactive map, the map view portal 318 can cause display of incident cards 324 and/or resources associated with the security system 100 within the interactive map. In some examples, the map view portal 318 is synchronized with the security system portal 314 and/or the task management portal 316. In such examples, the map view portal 318 synchronizes changes to and/or generation of new incident cards 324 with the security system portal 314 and/or the task management portal 316. Moreover, the map view portal 318 causes the display of incident cards 324 within an interactive map to update in accordance with changes made to the incident cards 324 using the security system portal 314 and/or the task management portal 316.

In some examples, the map view portal 318 is integrated with the security system portal 314 and/or the task management portal 316. In some examples, the portal server 106 does not implement a map view portal 318. In some examples, the functions of the map view portal 318 described herein are implemented locally on a security system computing device 108 and/or a task management computing device 108.

FIG. 4 is a block diagram of an example incident card 324, according to the present teachings. As described herein, an incident card 324 can be generated using the security system portal 314 (e.g., automatically by the security system portal 314 and/or manually by a user of the security system computing device 108 connected to the security system portal 314), using the task management portal 316 (e.g., automatically by the security system portal and/or manually by a user of the task management computing device 110 connected to the task management portal 316), and/or using the map view portal 318.

In the illustrated example of FIG. 4, the incident card 324 includes a plurality of information fields 402. These information fields 402 include a field that identifies a type of incident associated with the incident card 324, a field that identifies a location associated with the incident card 324, a field that identifies a time at which the incident associated with the incident card 324 occurred, a field that identifies a date on which the incident associated with the incident card 324 occurred, a field that identifies a security device 104 that generated security data 322 associated with the incident associated with the incident card 324, and a field that identifies an urgency associated with the incident card 324. In the illustrated example of FIG. 4, as indicated by the information fields 402, the incident card 324 is associated with a break-in that occurred in Building C at 11:31:27 on 10/1/2024. The information fields 402 further indicate that there is a high degree of urgency associated with the incident and that the security camera 104-B captured the incident in the security data 322 generated by the security camera 104-B.

In some examples, one or more of the information fields 402 are automatically populated (e.g., by the security system portal 314, the task management portal 316, or the map view portal 318) when the incident card 324 is generated. In some examples, one or more of the information fields 402 are not automatically populated when the incident card 324 is generated. In such examples, the unpopulated information fields 402 can be filled in, for example, using a security system computing device 108 connected to the security system portal 314, a task management computing device 110 connected to the task management portal 316, and or a computing device in the computing system 102 connected to the map view portal 318. As changes are made to one or more information fields 402 via one portal (e.g., security system portal 314, task management portal 316, or map view portal 318) and/or computing device (e.g., security system computing device 108, task management computing device 110, and/or some other computing device in computing system 102), the changes to the one or more information fields 402 are synchronized in real-time with the other portals and/or computing devices.

Persons skilled in the art should understand that the amount and/or types of information fields 402 shown in FIG. 4 and described herein are provided merely as non-limiting examples. In that regard, in some examples, the incident card 324 can include more or fewer information fields 402 than the ones shown in the illustrated example of FIG. 4. Moreover, in some examples, the information fields 402 can include fields that contain other types of identifying information associated with the incident card 324, for example an indication of one or more related incident cards.

As further shown in FIG. 4, the incident card 324 includes information that describes a task 404 to be performed in relation to the incident associated with the incident card 324. As described herein with respect to FIGS. 1 and 3, a task 404 to be performed in relation to the incident includes, for example, one or more actions to be performed in response to detection and/or the occurrence of the incident. In that regard, the information describing the task 404 includes one or more task fields 406 that can be populated with information relating to performance of the task 404. For example, the task fields 406 include a field that identifies one or more actions that need to be performed in order to complete the task 404, a field that identifies one or more resources assigned to complete the task 404, and a field that identifies and/or indicates an amount of progress that has been made towards completing the task 404. In the illustrated example of FIG. 4, as indicated by the task fields 406, actions that need to be performed include securing the scene of the incident, repairing a damaged window, and replacing a damaged security camera 104-B. As further indicated by the task fields 406, resources assigned to the task 404 include two security guards, two maintenance technicians, a new security camera, and a new window. The task 404 is 33% complete. In some examples, security devices 104 that generated security data associated with the incident and/or that are located proximate the location of the incident can also be designated, or assigned, as resources via the task fields 406.

Persons skilled in the art should understand that the amount and/or types of task fields 406 shown in FIG. 4 and described herein are provided merely as non-limiting examples. In that regard, in some examples, the incident card 324 can include more or fewer task fields 406 than the ones shown in the illustrated example of FIG. 4. Moreover, in some examples, the task fields 406 can include fields that contain other types of information associated with the task 404 described in the incident card 324.

In some examples, one or more of the task fields 406 can be automatically populated (e.g., by the security system portal 314, the task management portal 316, or the map view portal 318) when the incident card 324 is generated. In some examples, one or more of the task fields 406 are not automatically populated when the incident card 324 is generated. In such examples, the unpopulated task fields 406 can be filled in, for example, using a security system computing device 108 connected to the security system portal 314, a task management computing device 110 connected to the task management portal 316, and or a computing device in the computing system 102 connected to the map view portal 318. As changes are made to one or more task fields 406 via one portal (e.g., security system portal 314, task management portal 316, or map view portal 318) and/or computing device (e.g., security system computing device 108, task management computing device 110, and/or some other computing device in computing system 102), the changes to the one or more task fields 406 are synchronized in real-time with the other portals and/or computing devices.

Figure 5:
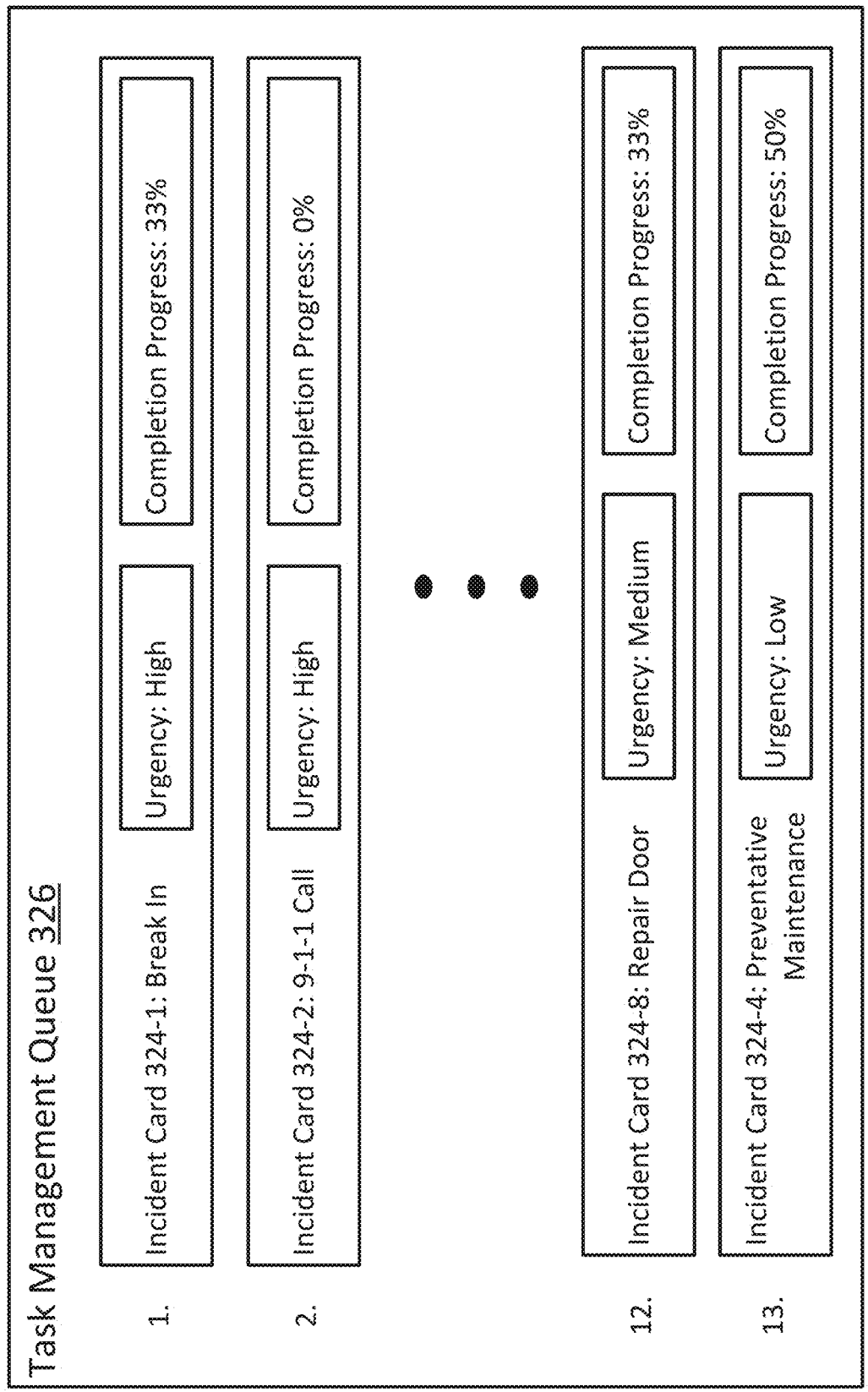
FIG. 5 is a block diagram of a task management queue, according to the present teachings.

FIG. 5 is a block diagram of an example task management queue 326, according to the present teachings. As described herein, a task management queue 326 can be used by the task management portal 316 to store and/or manage tasks described in incident cards 324. The task management queue 326 can be used to store and/or organize incident cards 324 that were generated using the security system portal 314, using the task management portal 316, and/or using the map view portal 318.

In the illustrated example of FIG. 5, the incident cards 324 stored in the task management queue 326 are arranged, or ranked, according to respective urgencies of the tasks 404 described in the incident cards 324. For example, the incident card 324-1 describes a task that has a high urgency, and thus, is ranked first in the task management queue 326, the incident card 324-2 describes a task that has a high urgency, and thus, is ranked second in the task management queue 326, the incident card 324-8 describes a task that has a medium urgency, and thus, is ranked twelfth in the task management queue 326, and the incident card 324-4 describes a task that has a low urgency, and thus, is ranked thirteenth in the task management queue 326. In some examples, the incident cards 324 can be ranked, or positioned, in the task management queue 326 according to a different criteria (e.g., type of incident, amount of progress made towards completing a task, date and/or time the incident card was created, etc.), or according to any suitable combination of criteria.

As shown in the illustrated example of FIG. 5, the representations of the incident cards 324 that are displayed in the task management queue 326 only indicate a type of incident associated with the incident card 324, an urgency of the task described in the incident card 324, and an amount of progress made towards completing the task described in the incident card 324. However, as will be described in more detail herein, a user can interact with a representation of an incident card 324 displayed within the task management queue 326 to view additional information (e.g., the information fields 402 and/or the task fields 406) included in the incident card 324.

Figure 6:
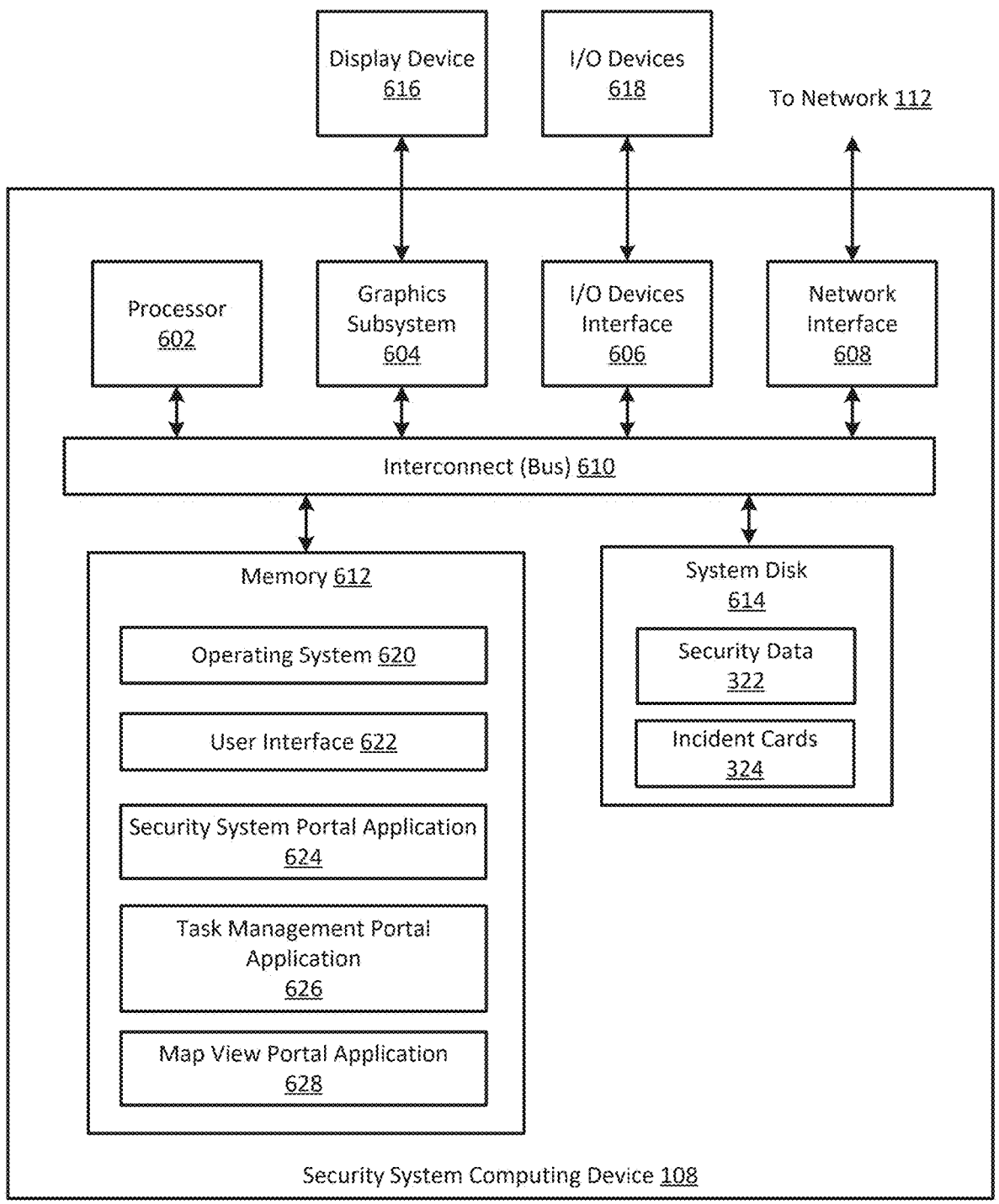
FIG. 6 is a block diagram of a security system computing device that may be implemented in conjunction with a computing system, according to the present teachings.

FIG. 6 is a block diagram of a security system computing device 108 that may be implemented in conjunction with the computing system 102, according to present teachings. The security system computing device 108 may be implemented as, for example, one or more of a desktop computer, a laptop, a tablet, a smart phone, a server, or some other similar computing device.

As shown, the security system computing device 108 may include, without limitation, a processor 602, a graphics subsystem 604, an I/O devices interface 606, a network interface 608, an interconnect 610, a memory subsystem 612, and a system disk 614. The interconnect 610 is adapted to facilitate transmission of data, such as programming instructions and application data, between the processor 602, the graphics subsystem 604, the I/O devices interface 606, the network interface 608, the memory subsystem 612, and the system disk 614.

In some embodiments, the processor 602 (e.g., a CPU or similar processor) is adapted to retrieve and execute programming instructions stored in the memory subsystem 612. Similarly, the processor 602 is adapted to store and retrieve application data (e.g., software libraries) residing in the memory subsystem 612 and/or the system disk 614. The interconnect 610 is adapted to facilitate transmission of data, such as programming instructions and application data, between the processor 602, the graphics subsystem 604, the I/O devices interface 606, the network interface 608, the memory subsystem 612, and the system disk 614.

In some embodiments, the graphics subsystem 604 is adapted to generate frames of image and/or video data and transmit the frames of image and/or video data to display device 616. In some embodiments, the graphics subsystem 604 may be integrated into an integrated circuit, along with the processor 602. The display device 616 may comprise any technically feasible means for generating an image for display. For example, the display device 616 may be fabricated using liquid crystal display (LCD) technology, cathode-ray technology, and light-emitting diode (LED) display technology. The display device 616 may include, for example, one or more monitors.

The input/output (I/O) device interface 606 is adapted to receive input data from user I/O devices 618 and transmit the input data to the processor 602 via the interconnect 610. For example, user I/O devices 618 may comprise one or more buttons, a keyboard, and a mouse or other pointing device. The I/O device interface 606 also includes an audio output unit adapted to generate an electrical audio output signal. User I/O devices 618 may comprise one or more speakers adapted to generate an acoustic output in response to the electrical audio output signal. In alternative embodiments, the display device 616 may include the speaker. In some examples, one or more security devices 104 can be connected to the security system computing device 108 via the I/O devices interface 606.

The network interface 608 is adapted to transmit and receive packets of data via the network 112. For example, the network interface 608 is used to receive security data 322 from one or more security devices 104, transmit security data 322 to the portal server 106, retrieve security data 322 from the portal server 106, access the security system portal 314 to generate and/or modify incident cards 324, and/or synchronize generation and/or modification of incident cards 324 with the security system portal 314, the task management portal 316, and/or the map view portal 318. In some embodiments, the network interface 608 is adapted to communicate using the well-known Ethernet standard. The network interface 608 is coupled to the processor 602 via the interconnect 610.

The system disk 614, such as a hard disk drive or flash memory storage drive, is adapted to store non-volatile data. For example, the system disk 614 can store security data 322 generated by the one or more security devices 104. In some examples, the system disk 614 can store incident cards 324.

In some embodiments, the memory subsystem 612 includes programming instructions and application data that comprise an operating system 620, a user interface 622, a security system portal application 624, a task management portal application 626, and a map view portal application 628. The operating system 620 performs system management functions such as managing hardware devices including graphics subsystem 604, I/O device interface 606, the network interface 608, and system disk 614. The operating system 620 also provides process and memory management models for the user interface 622, the security system portal application 624, the task management portal application 626, and/or the map view portal application 628. The user interface 622, such as a window and object metaphor, provides a mechanism for user interaction with security system computing device 108. Persons skilled in the art will recognize the various operating systems and user interfaces that are well-known in the art and suitable for incorporation into the security system computing device 108.

In some examples, the security system portal application 624 is a web-based application that provides access to the security system portal 314 running on the portal server 106. In such examples, the security system portal application 624 can be used by a user of the security system computing device 108 to perform one or more of the functions described herein with respect security system portal 314 (e.g., retrieve and view security data 322, generate incident cards 324, modify incident cards 324, etc.).

In some examples, the security system portal application 624 is a software application that is stored locally in the memory 612 and/or the system 614. In such examples, the security system portal application 624 can perform one or more of the functions described herein with respect to the security system portal 314 locally on the security system computing device 108 without connecting to the security system portal 314.

In some examples, the security system portal application 624 is integrated with the task management portal application 626 and/or the map view portal application 628. In some examples, the security system portal application 624 can be implemented as a plug-in feature and/or an extension of the task management portal application 626. In such examples, the one or more functions described herein with respect to the security system portal application 624 and/or the security system portal 314 can also be performed using the task management portal application 626 and/or the task management portal 316.

In operation, the security system portal application 624 can be used to retrieve and view security data 322, such as video footage and/or access control data generated by a security device 104. For example, the security system portal application 624 can connect to the security system portal 314 and the security system portal 314 can cause the display of the security data 322 within a window of the security system portal application 624 on the display device 616. As another example, the security system portal application 624 can be used to view security data 322 stored locally in the system disk 614 and/or received directly from a security device 104.

Figure 7A:
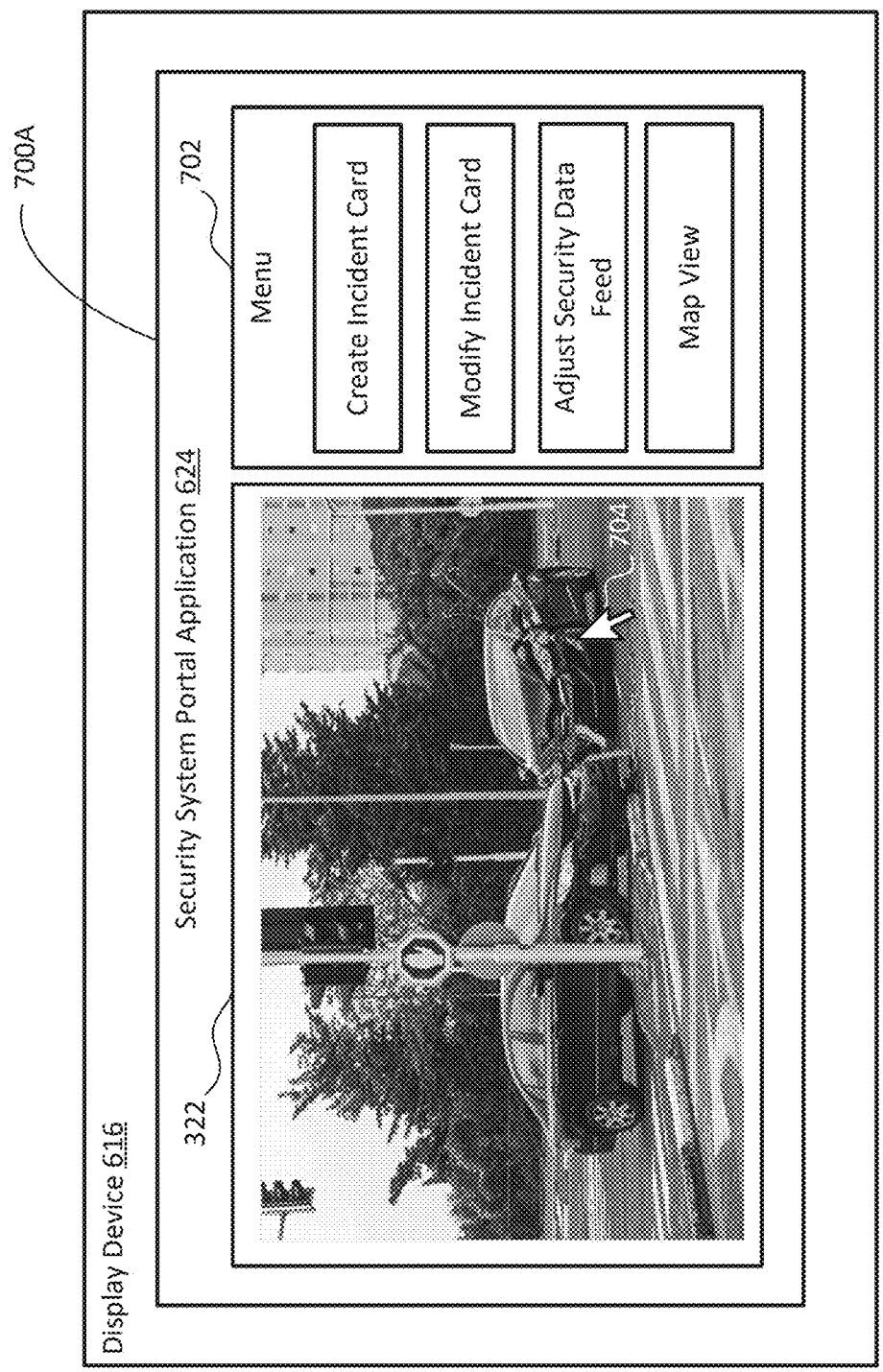
FIG. 7A illustrates an example window that is presented to a user for viewing security data, according to the present teachings.

FIG. 7A illustrates an example window that is presented to a user for viewing security data, according to the present teachings. For example, FIG. 7A illustrates an example window 700A of the security system portal application 624 that is displayed on the display device 616 of the security system computing device 108. As shown in FIG. 7A, the window 700A displays security data 322 in the form of video content generated by a security device 104. In the illustrated example of FIG. 7A, the security data 322 indicates that a collision involving two vehicles has occurred. In that regard, the type of incident associated with the security data 322 is a car accident.

In addition, the window 700A displays a menu 702 that includes a plurality of selectable options for interacting with the security data 322 displayed within the window 700A and/or performing one or more other actions. For example, the menu 702 includes an option for creating an incident card, an option for modifying an incident card, an option for adjusting the security data feed that is displayed within the window 700A (e.g., changing the security data/video content that is displayed), and an option for displaying a map view. Using a cursor 704, the user can select an option from the menu 702 and/or interact with the security data 322 displayed within the window 700A. For example, a user can create a new incident card 324 by using the cursor 704 to select the "Create Incident Card" option. Similarly, the user can modify an existing incident card 324 by using the cursor 704 to select the "Modify Incident Card" option. Moreover, a user can change the security data feed displayed within the window 700A by using the cursor 704 to select the "adjust security data feed" option or use the map view feature by using the cursor 704 to select the "Map View" option.

Figure 7B:
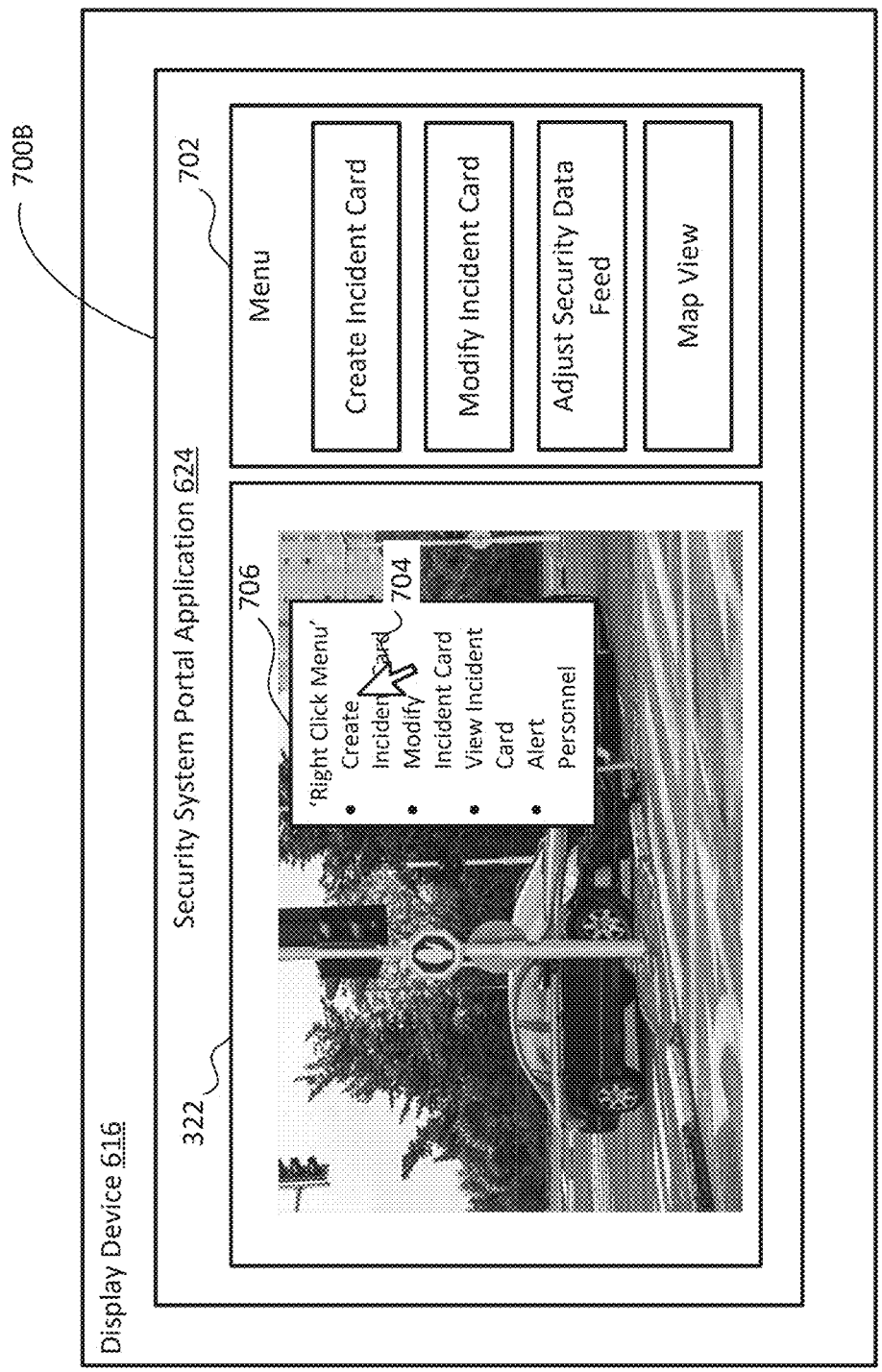
FIG. 7B illustrates an example prompt that is presented to a user for creating an incident card, according to the present teachings.

FIG. 7B illustrates an example prompt that is presented to a user for creating an incident card, according to the present teachings. For example, FIG. 7B illustrates an example window 700B of the security system portal application 624 in which a prompt window 706 is presented to a user in response to the security system portal application 624 detecting user interaction with the security data 322 being displayed within the window 700B. User interaction can include, for example, clicking on the security data 322 with the cursor 704, hovering over the security data 322 with the cursor 704, or some other user interaction with the security data 322.

As shown in FIG. 7B, the prompt window 706 provides a list of options for a user to interact with the security data 322 displayed within window 700B. The list of options provided by the prompt window 706 includes, for example, a create incident card option, a modify incident card option, a view incident card option, and an alert personnel option. In the illustrated example of FIG. 7B, a user may desire to create a new incident card 324 in response to detecting the occurrence of the car accident in the security data 322. In that regard, the user can interact with, via the cursor 704, the security data 322 displayed within the window 700B and select, via the cursor 704, the "Create Incident Option" that is presented to the user via the prompt window 706.

In some examples, the user can alternatively select the "Create Incident Card" option included in the menu 702 to generate a new incident card 324 after detecting the occurrence of the car accident. In some examples, the security system portal application 624 can detect the occurrence of the car accident in the security data 322 and automatically generate a new incident card 324 associated with the car accident without user intervention.

In some examples, when creating a new incident card 324, a user can select from one or more existing templates of incident cards based on the type of incident and/or event associated with the incident card 324. For example, when an incident card 324 associated with a first type of event and/or incident is created, the user can select a first template that includes one or more information fields 402 and/or task fields 406 that are specific to the first type of event and/or incident. Likewise, when an incident card 324 associated with a second type of event and/or incident is created, the user can select a second template that includes one or more information fields 402 and/or task fields 406 that are specific to the second type of event and/or incident. In some examples, as a user populates an information field 402 during creation of a new incident card 324, such as the field that identifies the type of incident, a template that corresponds to the populated information field 402 may be used to modify and/or automatically fill in some of the information fields 402 and/or task fields 406 included in the new incident card 324. In some examples, templates for incident cards 324 can also indicate and/or dictate which task management queue 326 an incident card 324 gets added to.

Figure 7C:
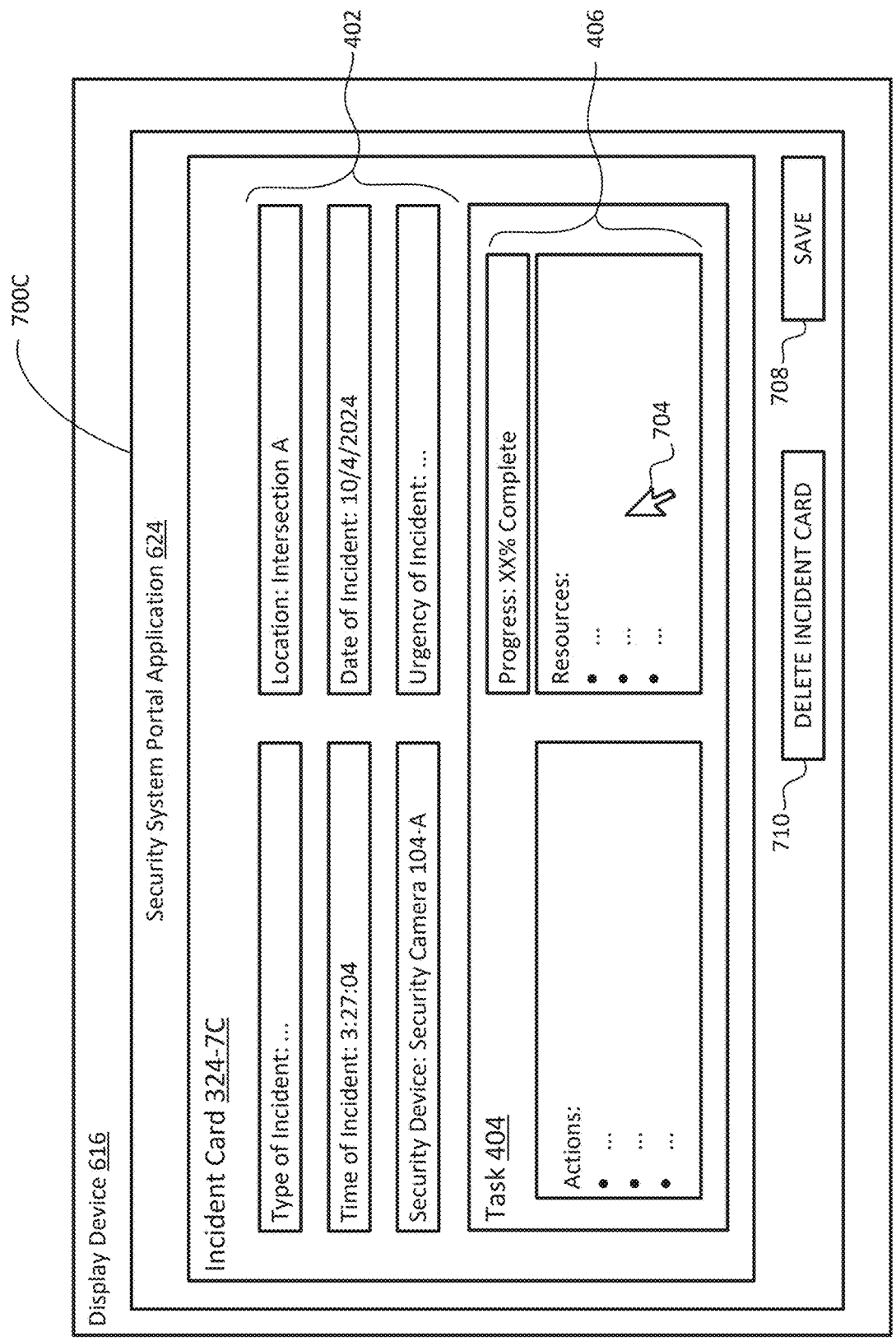
FIG. 7C illustrates an example window that is presented to a user for populating information fields in an incident card, according to the present teachings.

FIG. 7C illustrates an example window that is presented to a user for populating information fields in an incident card, according to the present teachings. For example, FIG. 7C illustrates an example window 700C of the security system portal application 624 in which an incident card 324-7C is presented to a user for populating the information fields 402 and/or the task fields 406 included in the incident card 324-7C. In some examples, the incident card 324-7C is presented to a user in response to generation of the incident card 324-7C. For example, the incident card 324-7C is presented to the user after the user selects, via the cursor 704, a "Create Incident Card" option included in the menu 702 and/or in the prompt window 706. In some examples, the incident card 324-7C is presented after the user selects, via the cursor 704, a "Modify Incident Card" option included in the menu 702 and/or in the prompt window 706. In some examples, the incident card 324-7C is presented to a user in response to the incident card 324-7C being automatically generated by the security system portal 314 and/or the security system portal application 624.

As shown in FIG. 7C, a user can populate and/or modify the information fields 402 and/or the task fields 406 included in the incident card 324-7C. In some examples, one or more of the information fields 402 and/or the task fields 406 can be automatically populated by the security system portal 314 and/or the security system portal application 624 when the incident card 324-7C is generated. In the illustrated example of FIG. 7C, the information fields 402 that indicate the location of the incident, the time at which the incident occurred, the date on which the incident occurred, and/or the security device 104 that generated the security data 322 associated with the incident 324-7C are automatically populated when the incident card 324-7C is generated. However, in other examples, one or more of the other information fields 402 and/or task fields can be automatically populated.

Furthermore, in some examples, one or more of the information fields 402 and/or the task fields 406 are not automatically populated by the security system portal 314 and/or the security system portal application 624 when the incident card 324-7C is generated. In such examples, the window 700C may prompt a user to populate the unpopulated information fields 402 and/or task fields 406. In the illustrated example of FIG. 7C, the information fields 402 that indicate the type of incident and the urgency of the incident are not automatically populated. In that regard, the user can update, or modify, the incident card 324-7C by populating the type of incident information field 402 with "car accident" and the urgency of incident information field 406 with "high." Similarly, the user can populate the unpopulated task fields 406. When a user is done populating and/or modifying the information fields 402 and/or task fields 406, the user can save the updates to the incident card 324-7C via the save button 708. When a user wishes to delete an incident card 324, for example after the task 404 described in the incident card is completed, the user can delete the incident card 324 via the delete incident card button 710.

As described herein, in some examples, deleting an incident card 324 results in the erasure of the incident card 324 along with the data contained in the incident card 324. In other examples, deleting an incident card does not result in the erasure of the data contained in that incident card 324. Rather, in such examples, deletion of an incident card 324 causes removal of that incident card 324 from inclusion in a task management queue 326 and/or display on a map (see FIGS. 11A-11E). Moreover, in such examples, when an incident card 324 is "deleted" from a task management queue 326 and/or a map, the incident card 324 along with the data contained therein is archived. For example, an incident card can be archived in long term storage of one or more of the portal server(s) 106, the security system computing device(s) 108, and/or the task management computing device(s) 110. In some examples, the delete incident card button 710 is replaced with an archive incident card button. In some examples, the window 700C additionally includes an archive incident card button that is different than the delete incident card button 710. In such examples, selection of the delete incident card button 710 results in erasure of the data contained in the incident card 324 and selection of the archive incident card button results in archival of the incident card 324 as described herein, Persons skilled in the art will understand that FIGS. 7A-7C are provided merely as non-limiting examples. In that regard, persons skilled in the art should understand that any suitable variations of FIGS. 7A-7C can be used in accordance with the techniques described herein.

As described herein, when a new incident card 324 is generated using the security system portal 314 and/or the security system portal application 624, the generation of the new incident card 324 is synchronized (e.g., via the portal server 106) with the task management portal 316 and/or the map view portal 318. In that regard, when a new incident card 324 is generated by the security system portal 314 and/or the security system portal application 624, the new incident card 324 is made visible to users accessing the task management portal 316 and/or the map view portal 318 in real-time. Moreover, the new incident card 324 can be added to a task management queue 326 following generation of the new incident card 324.

Similarly, when an incident card is modified (e.g., by updating information fields 402, updating task fields 406, etc.) using the security system portal 314 and/or the security system portal application 624, the modifications to the incident card 324 are synchronized (e.g., via the portal server 106) with the task management portal 316 and/or the map view portal 318. In that regard, as a user of the security system computing device 108 modifies an incident card 324 using the security system portal application 624, the modifications to the incident card 324 are made visible to users accessing the task management portal 316 and/or the map view portal 318 in real-time.

Moreover, when an incident card is deleted using the security system portal 314 and/or the security system portal application 624, deletion of the incident card 324 is synchronized (e.g., via the portal server 106) with the task management portal 316 and/or the map view portal 318. In that regard, when a user of the security system computing device 108 deletes an incident card 324 using the security system portal application 624, deletion of the incident card 324 is reflected in real-time to users accessing the task management portal 316 and/or the map view portal 318.

Likewise, when an incident card is archived using the security system portal 314 and/or the security system portal application 624, archival of the incident card 324 is synchronized (e.g., via the portal server 106) with the task management portal 316 and/or the map view portal 318. In that regard, when a user of the security system computing device 108 archives an incident card 324 using the security system portal application 624, archival of the incident card 324 is reflected in real-time to users accessing the task management portal 316 and/or the map view portal 318 (e.g., the incident card 324 is removed from a task management queue 326 and/or a map in real-time).

Although the security system computing device 108 can be used to implement the task management portal application 626, operation of the task management application 626 will be described with respect to the task management computing device 110 and FIGS. 8-9. Moreover, operation of the map view portal application 628 will be described with respect to FIGS. 11A-11E.

Figure 8:
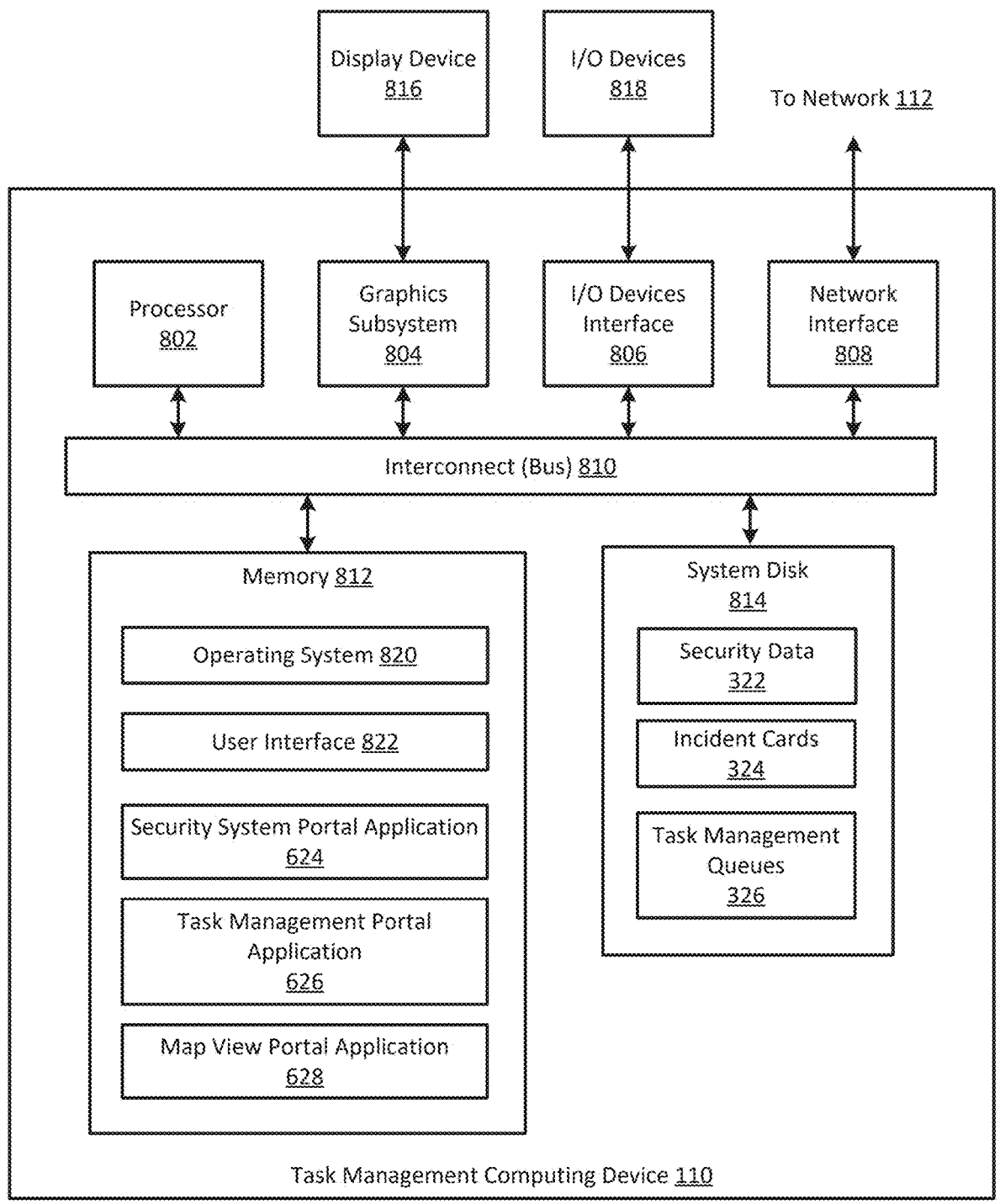
FIG. 8 is a block diagram of a task management computing device that may be implemented in conjunction with a computing system, according to the present teachings.

FIG. 8 is a block diagram of a task management computing device 110 that may be implemented in conjunction with the computing system 102, according to present teachings. The task management computing device 110 may be implemented as, for example, one or more of a desktop computer, a laptop, a tablet, a smart phone, a server, or some other similar computing device.

As shown, the task management computing device 110 may include, without limitation, a processor 802, a graphics subsystem 804, an I/O devices interface 806, a network interface 808, an interconnect 810, a memory subsystem 812, and a system disk 814. The interconnect 810 is adapted to facilitate transmission of data, such as programming instructions and application data, between the processor 802, the graphics subsystem 804, the I/O devices interface 806, the network interface 808, the memory subsystem 812, and the system disk 814.

In some embodiments, the processor 802 (e.g., a CPU or similar processor) is adapted to retrieve and execute programming instructions stored in the memory subsystem 812. Similarly, the processor 802 is adapted to store and retrieve application data (e.g., software libraries) residing in the memory subsystem 812 and/or the system disk 814. The interconnect 810 is adapted to facilitate transmission of data, such as programming instructions and application data, between the processor 802, the graphics subsystem 804, the I/O devices interface 806, the network interface 808, the memory subsystem 812, and the system disk 814.

In some embodiments, the graphics subsystem 804 is adapted to generate frames of image and/or video data and transmit the frames of image and/or video data to display device 816. In some embodiments, the graphics subsystem 804 may be integrated into an integrated circuit, along with the processor 802. The display device 816 may comprise any technically feasible means for generating an image for display. For example, the display device 816 may be fabricated using liquid crystal display (LCD) technology, cathode-ray technology, and light-emitting diode (LED) display technology. The display device 816 may include, for example, one or more monitors.

The input/output (I/O) device interface 806 is adapted to receive input data from user I/O devices 818 and transmit the input data to the processor 802 via the interconnect 810. For example, user I/O devices 818 may comprise one or more buttons, a keyboard, and a mouse or other pointing device. The I/O device interface 806 also includes an audio output unit adapted to generate an electrical audio output signal. User I/O devices 818 may comprise one or more speakers adapted to generate an acoustic output in response to the electrical audio output signal. In alternative embodiments, the display device 816 may include the speaker. In some examples, one or more security devices 104 can be connected to the task management computing device 110 via the I/O devices interface 806.

The network interface 808 is adapted to transmit and receive packets of data via the network 112. For example, the network interface 808 is used to receive incident cards 324 from one or more computing devices (e.g., the portal server 106, the security system computing device 108) included in the computing system 102, transmit incident cards 324 to the portal server 106 and/or the security system computing device 108, and/or synchronize generation and/or modification of incident cards 324 with the security system portal 314, the task management portal 316, and/or the map view portal 318. In some embodiments, the network interface 808 is adapted to communicate using the well-known Ethernet standard. The network interface 808 is coupled to the processor 802 via the interconnect 810.

The system disk 814, such as a hard disk drive or flash memory storage drive, is adapted to store non-volatile data. For example, the system disk 814 can store security data 322 generated by the one or more security devices 104. In some examples, the system disk 814 can store incident cards 324. In some examples, the system disk 814 stores one or more task management queues 326.

In some embodiments, the memory subsystem 812 includes programming instructions and application data that comprise an operating system 820, a user interface 822, a security system portal application 624, a task management portal application 626, and a map view portal application 628. The operating system 820 performs system management functions such as managing hardware devices including graphics subsystem 804, I/O device interface 806, the network interface 808, and system disk 814. The operating system 820 also provides process and memory management models for the user interface 822, the security system portal application 624, the task management portal application 626, and/or the map view portal application 628. The user interface 822, such as a window and object metaphor, provides a mechanism for user interaction with task management computing device 110. Persons skilled in the art will recognize the various operating systems and user interfaces that are well-known in the art and suitable for incorporation into the task management computing device 110.

In some examples, the security task management portal application 626 is a web-based application that provides access to the task management portal 316 running on the portal server 106. In such examples, the task management portal application 626 can be used by a user of the task management computing device 110 to perform one or more of the functions described herein with respect to the task management portal 316 (e.g., generate incident cards 324, add incident cards 324 to one or more task management queues 326, modify incident cards 324, assign resources to incident cards 324, synchronize generation and/or modification of incident cards 324 with the security system portal 314 and/or the map view portal 318, etc.).

In some examples, the task management portal application 626 is a software application that is stored locally in the memory 812 and/or the system 814. In such examples, the task management portal application 626 can perform one or more of the functions described herein with respect to the task management portal 316 locally on the task management computing device 110 without connecting to the task management portal 316.

In some examples, the task management portal application 626 is integrated with the security system portal application 624 and/or the map view portal application 628. In some examples, the task management portal application 626 can be implemented as a plug-in feature and/or an extension of the security system portal application 624. In such examples, the one or more functions described herein with respect to the task management portal application 626 and/or the task management portal 316 can also be performed using the security system portal application 624 and/or the security system portal 314.

In operation, the task management portal application 626 can be used to view and manage one or more task management queues 326. In some examples, the task management portal application 626 can connect to the task management portal 316 and the task management portal 316 can cause the display of the one or more task management queues 326 within a window of the task management portal application 626 displayed on the display device 816. As incident cards 324 included and displayed within the one or more task management queues 326 are modified (e.g., via the task management portal 316 and/or via the task management portal application 626, via the security system portal 314 and/or the security system portal application 624, via the map view portal 318 and/or the map view portal application 628, and/or via some other computing device in the computing system 102), the modifications to the incident cards 324 are synchronized with the task management portal 316. In that regard, the task management portal 316 causes the display of the one or more task management queues 326 and/or the incident cards 324 included in the one or more task management queues 326 to be updated in real-time to reflect the modifications. In some examples, the task management portal application 626 can be used to view incident cards 324 and/or task management queues 326 stored locally in the system disk 814.

Figure 9A:
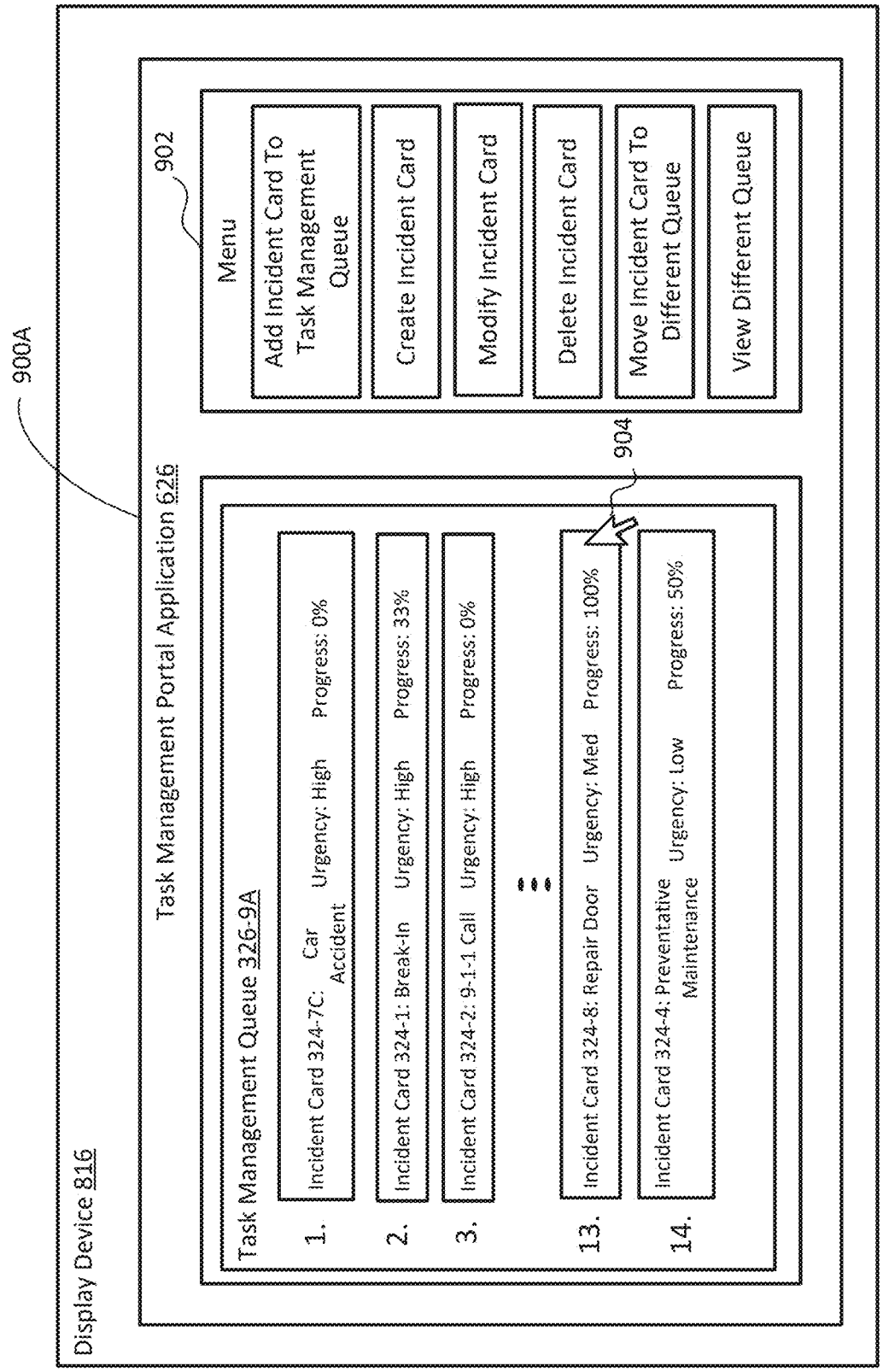
FIG. 9A illustrates an example window that is presented to a user for managing a task management queue, according to the present teachings.

FIG. 9A illustrates an example window that is presented to a user for managing a task management queue, according to the present teachings. For example, FIG. 9A illustrates an example window 900A of the task management portal application 626 that is displayed on the display device 816 of the task management computing device 110. As shown in FIG. 9A, the window 900A displays a task management queue 326-9A that includes numerous incident cards 324 associated with tasks to be performed. In the illustrated example of FIG. 9A, the task management queue 326-9A includes incident cards 324 arranged in an order from first to fourteenth. For example, the incident card 324-7C described with respect to FIG. 7C, was added to the first position in the task management queue 326-9A after the incident card 324-7C was generated using the security system portal 314 and/or the security system portal application 624. As another example, incident card 324-8 is stored in the eighth position of the task management queue 326-9A, the incident card 324-8 indicating that the task of repairing a door is complete (e.g., 100% progress).

In addition, the window 900A displays a menu 902 that includes a plurality of selectable options for performing one or more actions associated with a task management queue 326 and/or an incident card 324 displayed in the window 900A. For example, the menu 902 includes an option for adding an incident card to a task management queue, an option for creating an incident card, an option for modifying an incident card, an option for deleting an incident card, an option for moving an incident card to a different task management queue, and an option for viewing a different task management queue (e.g., changing the task management queue 326 that is displayed within the window 900A). Using a cursor 904, the user can select an option from the menu 902 and/or interact with the task management queue 326-9A displayed within the window 900A.

For example, a user can add a new incident card 324 to a task management queue 326 by using the cursor 904 to select the "Add Incident Card To Task Management Queue" option. However, in some examples, the task management portal 316 and/or the task management portal application 626 can automatically add new incident cards 324 to a task management queue 326. For example, the task management portal 316 automatically added the incident card 324-7C to the task management queue 326-9A after generation of the incident card 324-7C was synchronized with the task management portal 316. As another example, a user can create a new incident card 324 by using the cursor 904 to select the "Create Incident Card" option, a user can modify an existing incident card 324 by using the cursor 904 to select the "Modify Incident Card" option, a user can delete an incident card 324 by using the cursor 904 to select the "Delete Incident Card" option, a user can move an incident card 324 to a different task management queue 326 by selecting the "Move Incident card To Different Queue" option, or a user can view a different task management queue 326 by using the cursor 904 to select the "View Different Queue" option.

Figure 9B:
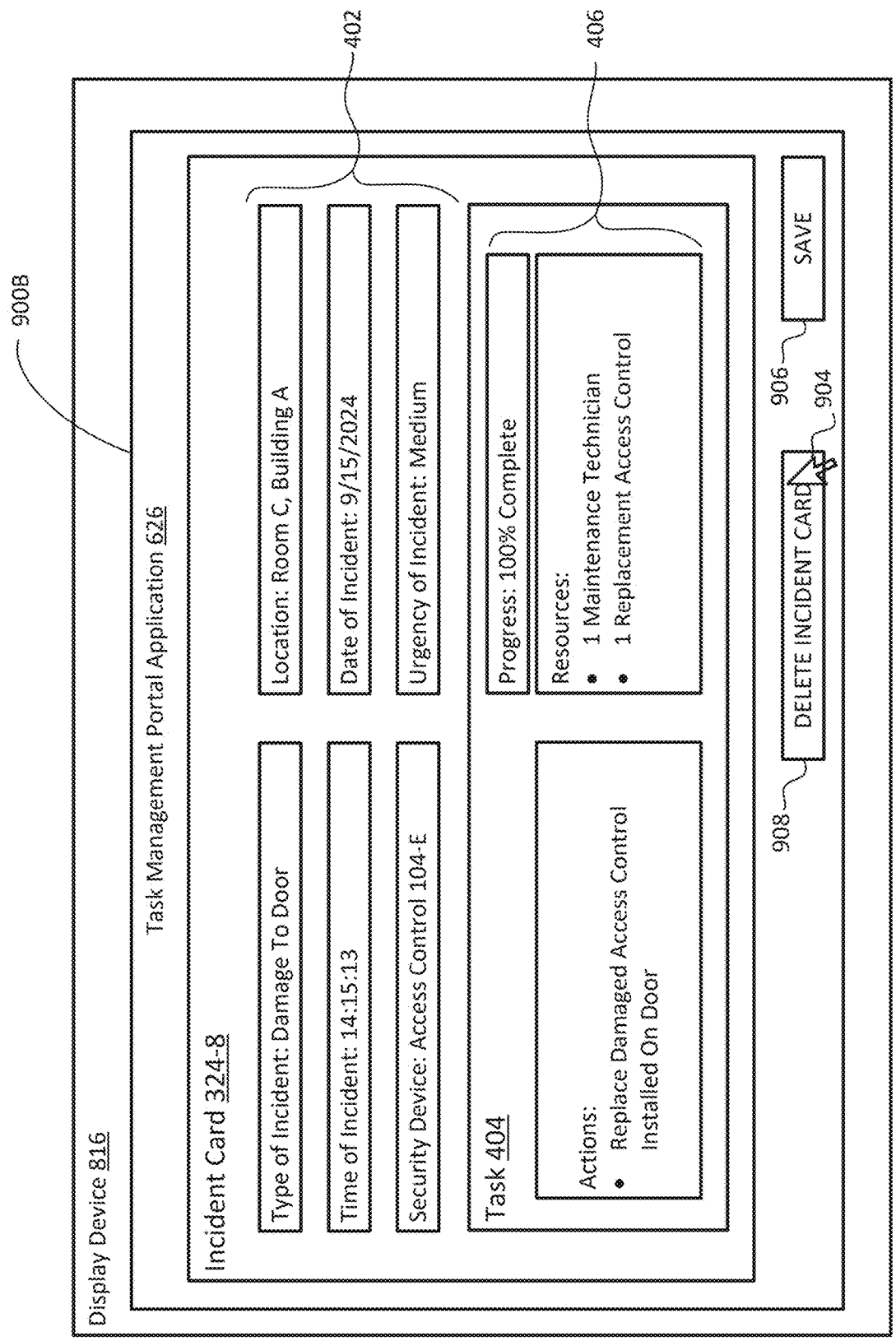
FIG. 9B illustrates an example window that is presented to a user following selection of an incident card displayed in a task management queue, according to the present teachings.

Moreover, a user can use the cursor 904 to select an incident card 324 included in a task management queue 326 to modify, delete, rearrange, and/or otherwise interact with the incident card 324. For example, as shown in FIG. 9A, a user can use the cursor 904 to select the incident card 324-8. FIG. 9B illustrates an example window that is presented to a user following selection of an incident card displayed in a task management queue, according to the present teachings. For example, FIG. 9B illustrates an example window 900B of the task management portal application 626 that is presented to a user in response to the task management portal application 626 detecting a user selection of incident card 324-8 included in the task management queue 326-9A.

As shown in FIG. 9B, the window 900B presents the information fields 402 and the task fields 406 included in the incident card 324-8 to the user. The user can select, using the cursor 904, any one or more of the information fields 402 and/or the task fields 406 to modify the information contained therein. As described herein, any modification made to the information fields 402 and/or task fields 406 of an incident card 324 via the window 900B are synchronized with the task management portal 316, the security system portal 314, and/or the map view portal 318. In some examples, modifications to the incident card 324-8 may be synchronized with the portals 314, 316, and/or 318 in response to a user using the cursor 904 to select the save button 906.

As further shown in FIG. 9B, the window 900B presents a delete incident card button 908 that, when selected using the cursor 904, can delete the incident card 324-8. Deletion of an incident card 3234 results in removal of the incident card 324 from a task management queue 326. In that regard, a user may desire to delete the incident card 324-8 because, in the illustrated example of FIGS. 9A and 9B, the task 404 described in the incident card 324-8 is complete (e.g., the task of replacing the damaged access control installed on the door in room C of Building A is 100% complete).

In some examples, such as in the illustrated example of FIG. 9B, an incident card 324 must be manually deleted and/or archived. For example, after a maintenance technician assigned to the incident card 324-8 completes the task 404 described in the incident card 324-8, the maintenance technician can update the incident card 324-8 to show the task 404 is 100% complete. In some examples, the maintenance technician further uses the delete incident card button 908 to delete the incident card 324-8. In some examples, the maintenance technician instead uses an archive incident card button (not shown) to archive the incident card 324-8. In some examples, a user other than the maintenance technician that completed the task 404 can use the task management portal application 626 to delete and/or archive the incident card 324-8 after seeing that the task 404 is 100% complete. In some examples, a user of the security system portal application 314 and/or the map view portal 318 can delete and/or archive the incident card 324-8. In some examples, the task management portal 316 and/or the task management portal application 626 can automatically delete and/or archive the incident card 324-8 in response to detecting that the progress task field 406 included in the incident card 324-8 has been updated to "100% complete."

As described herein, deletion and/or archival of an incident card 324 (e.g., via the window 900B) is synchronized with the security system portal 314, the task management portal 316, and/or the map view portal 318. In that regard, when an incident card 324 is deleted and/or archived, the task management portal 316 causes the deleted and/or archived incident card 324 to be removed from a task management queue 326 and/or causes the deleted and/or archived incident card 324 to no longer be displayed within the task management portal application 626. As another example, when an incident card 324 is deleted and/or archived, the map view portal 318 causes the deleted and/or archived incident card 324 to be removed from an interactive map displayed within the map view portal application 628 implemented on a computing device in the computing system 102.

Figure 9C:
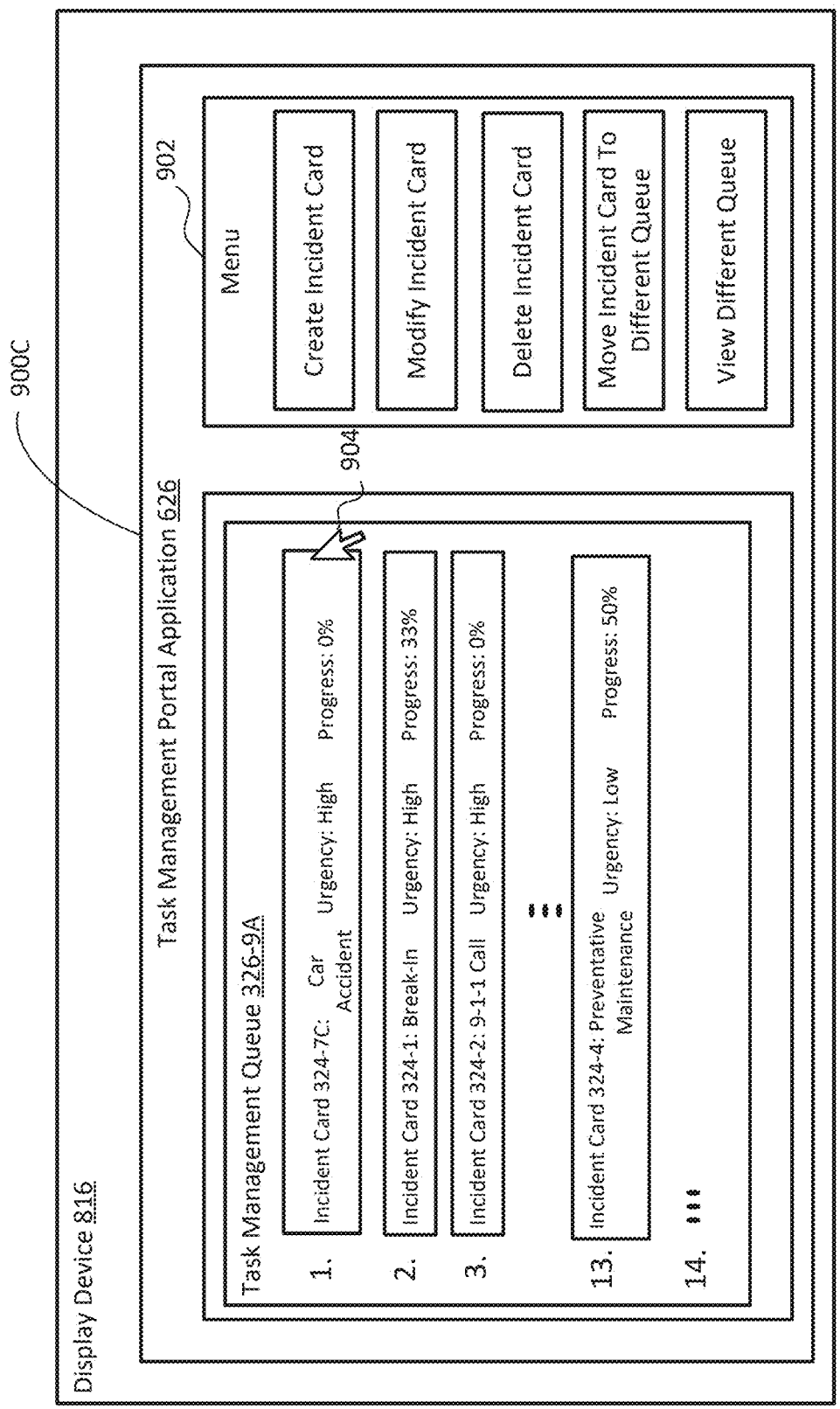
FIG. 9C illustrates an example window that is presented to a user following removal of an incident card from a task management queue, according to the present teachings.

FIG. 9C illustrates an example window that is presented to a user following removal of an incident card from a task management queue, according to the present teachings. For example, FIG. 9C illustrates an example window 900C of the task management portal application 626 that is displayed on the display device 816 of the task management computing device 110 following deletion of the incident card 324-8. As shown in FIG. 9C, the incident card 324-8 has been removed from the task management queue 326-9A following deletion of the incident card 324-8. Moreover, following deletion of the incident card 324-8 and subsequent removal from the task management queue 326-9A, the incident card 324-4 has been moved up to position thirteen in the task management queue 326-9A.

As described with respect to the illustrated example of FIG. 7C, when the incident card 324-7C was generated, some of the information fields 402 included in the incident card 324-7C were automatically populated by the security system portal 314 and/or the security system portal application 624. However, as further described with respect to the illustrated example FIG. 7C, some of the information fields 402 and/or the task fields 406 included in the incident card 324-7C were left unpopulated when the incident card 324-7C was generated. In that regard, a user of the task management portal application 626 may desire to populate one or more of the unpopulated information fields 402 and/or the task fields 406 included in the incident card 324-7C. As further shown in FIG. 9C, a user can use the cursor 904 to select the incident card 324-7C displayed within the task management queue 326-9A in window 900C to modify the incident card 324-7C.

Figure 9D:
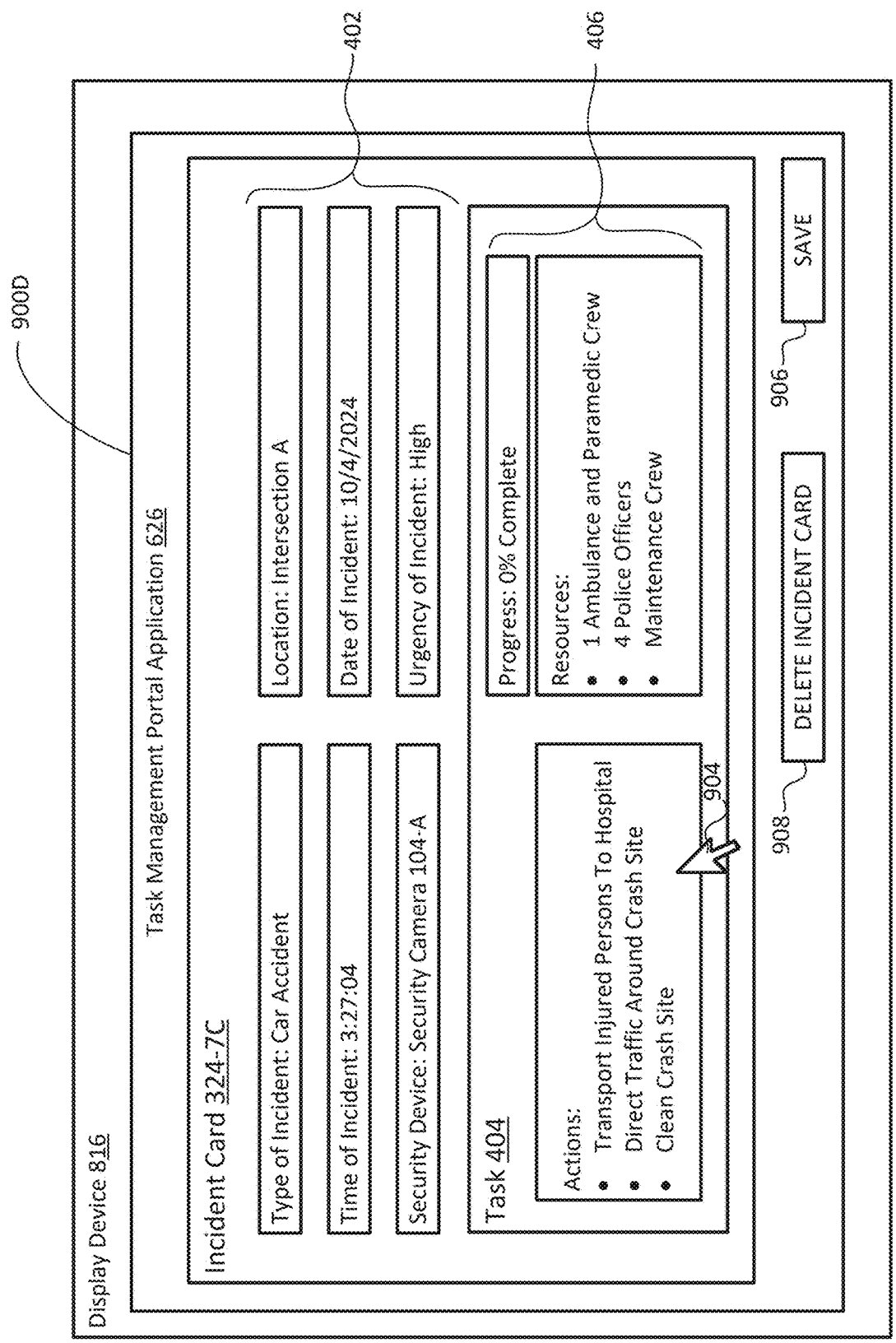
FIG. 9D illustrates another example window that is presented to a following selection of an incident card displayed in a task management queue, according to the present teachings.

FIG. 9D illustrates another example window that is presented to a user following selection of an incident card displayed in a task management queue, according to the present teachings. For example, FIG. 9D illustrates an example window 900D of the task management portal application 626 that is presented to a user in response to the task management portal application 626 detecting a user selection of incident card 324-7C included in the task management queue 326-9A.

As shown in FIG. 9D, the window 900D presents the information fields 402 and the task fields 406 included in the incident card 324-7C to the user. The user can select, using the cursor 904, any one or more of the information fields 402 and/or the task fields 406 to modify the information contained therein to populate the fields and/or modify the information included in the fields. In the illustrated example of FIG. 9D, the user has populated the previously unpopulated task fields 406 with information describing one or more actions to be performed responsive to the car accident (e.g., transport injured persons to the hospital, direct traffic around the crash site, and clean the crash site), one or more resources assigned to perform the one or more actions (e.g., 1 ambulance and paramedic crew, 4 police officers, and a maintenance crew), and an amount of progress made towards completing the one or more actions (e.g., 0%).

In some examples, the task management portal 316 and/or the task management portal application 626 can assign resources to the incident card 324-7C (e.g., fill in the task field 406 related to resources) automatically, without input from a user, based on one or more rules and/or based on access to a list of resources available to perform the task 404. For example, the task management portal 316 and/or the task management portal application 626 can access a list of available resources stored in the system disk 314 of the portal server 106, can interface with one or more external computing systems (e.g., computer-aided dispatch systems, 9-1-1 call center systems, first responder systems, and/or maintenance systems) to determine which resources are available to assign to task 404 described in the incident card 324-7C. Moreover, the task management portal 316 and/or the task management portal application 626 can determine, based on one or more rules (e.g., rules regarding the proximity of resources to the incident, the type of incident, the urgency of the incident, etc.), which resources to assign to the task 404 described in the incident card In some examples, after one or more resources are assigned to the incident card 324-7C, the computing system 102 (e.g., the portal server 106 executing the security system portal 314 and/or the task management portal 316, the task management computing device 110 implementing the task management portal application 626, the security system computing device 108 implementing the security system portal application 624, etc.) can transmit notifications to respective computing devices and/or communication devices associated with the resources assigned to the incident card 324-7C. These notifications can be sent automatically and/or manually in response to user action.

In some examples, notifications associated with incident cards 324 can be transmitted to users instantaneously on a limited basis (e.g., notifications can be transmitted any time a change and/or update is made to an incident card 324). In some examples, notifications associated with incident cards 324 can be assembled and sent on a punctual and/or periodic basis. For example, the notifications associated with incident cards 324 can be assembled in the form of a digest report at the end of a day, the digest report outlining any and all changes made throughout the day to incident cards 324 associated with a user. In that regard, a user 324 can use a single notification to monitor changes made to incident cards 324 thereby avoiding inundation with many different notifications throughout the day.

As described herein, the task management computing device 110 can also implement the security system portal application 624. Thus, description herein of operation of the security system portal application 624 can also be applicable to the task management computing device 110. Moreover, operation of the map view portal application 628 will be described with respect to FIGS. 11A-11E.

Figure 10:
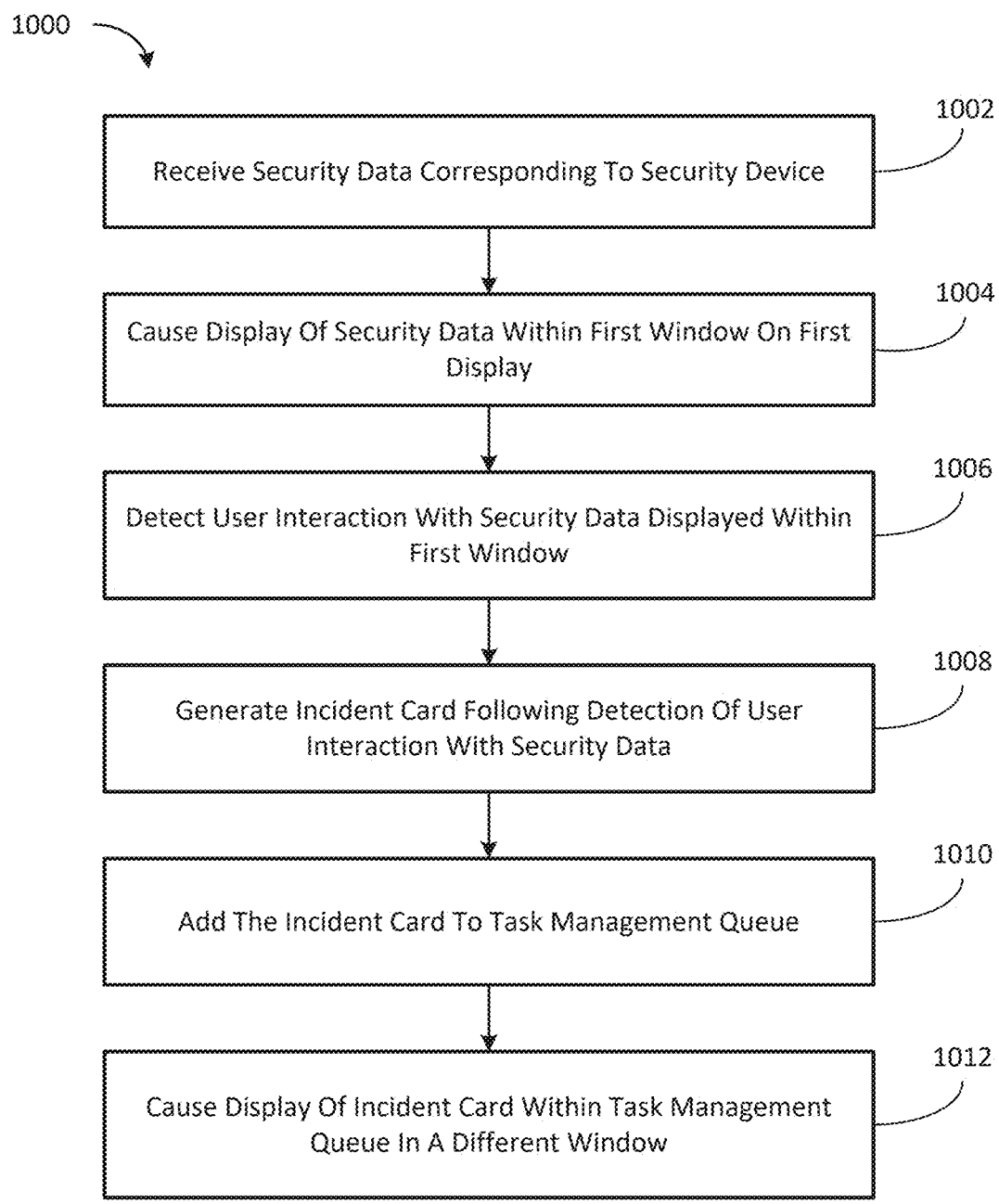
FIG. 10 is a flow diagram of method steps for synchronizing task management in a security system, according to the present teachings.

FIG. 10 is a flow diagram of method steps for synchronizing task management in a security system, according to the present teachings. Although the method steps are described with reference to the systems and processes of FIGS. 1-9, persons skilled in the art will understand that any system adapted to implement the method steps, in any order, falls within the scope of the present invention.

As shown, a method 1000 begins at step 1002, where security data corresponding to a security device is received. For example, the computing system 102 receives security data 322 generated by a security device 104. In some examples, the security system portal 314 implemented on the portal server 106 and/or the security system portal application 624 implemented on the security system computing device 108 receives the security data 322.

At step 1004, the security data is caused to display within a first window on a first display. For example, the computing system 102 causes display of the security data 322 within a first window on a first display device included in the computing system 102. In some examples, the security system portal 314 implemented on the portal server 106 causes display of the security data 322 within a window of the security system portal application 624 on the display device 616 of the security system computing device 108.

At step 1006, user interaction with the security data displayed within the first window is detected. For example, the computing system 102 detects user interaction with the security data 322 displayed within a first window on a first display device included in the computing system 102. In some examples, the security system portal 314 and/or the security system portal application 624 detects user interaction (e.g., a cursor selection) with the security data 322 displayed within the window of the security system portal application 624 on the display device 616 of the security system computing device 108. In some examples, the user interaction includes a request to generate an incident card.

At step 1008, an incident card is generated following detection of the user interaction with the security data. For example, the computing system 102 generates an incident card 324 following detection of the user interaction with the security data 322 displayed within the first window on a first display device included in the computing system 102. In some examples, the security system portal 314 and/or the security system portal application 624 generates an incident card 324 in response to detection of the user interaction (e.g., a cursor selection, request to create incident card, etc.) with the security data 322 displayed within the window of the security system portal application 624 on the display device 616 of the security system computing device 108.

At step 1010, the incident card is added to a task management queue. For example, the computing system 102 adds the incident card 324 to a task management queue 326. In some examples, the task management portal 316 and/or the task management portal application 626 adds the incident card to a task management queue 326.

At step 1012, the incident card within the task management queue is caused to display within a different window. For example, the computing system 102 causes display of the incident card 324 in the task management queue 326 within a second window on the first display device included in the computing system 102 and/or within a third window on a second display device included in the computing system 102. In some examples, the task management portal 316 implemented on the portal server 106 causes display of the incident card 324 in the task management queue 326 within a window of the task management portal application 626 on the display device 616 of the security system computing device 108. In some examples, the task management portal 316 implemented on the portal server 106 causes display of the incident card 324 in the task management queue 326 within a window of the task management portal application 626 on the display device 816 of the task management computing device 110.

As described herein, computing devices in the computing system 102 can further implement a map view portal application 628 in conjunction with the map view portal 318 implemented on the portal server 106. For example, the security system computing device 108 and/or the task management computing device 110 can implement the map view portal application 628 in conjunction with the map view portal 318. For the sake of explanation, operation of the map view portal application 628 is described herein with respect the security system computing device 108. However, persons skilled in the art will understand that description of the map view portal application 628 implemented on the security system computing device 108 is also applicable to implementation of the map view portal application 628 on the task management computing device 110.

In some examples, the map view portal application 628 is a web-based application that provides access to the security system portal 318 running on the portal server 106. In such examples, the map view portal application 628 can be used by a user of the security system computing device 108 to perform one or more of the functions described herein with respect to the map view system portal 318 (e.g., view an interactive map of an area associated with the security system 100, view incident cards 324 at respective locations displayed on the map, view security data associated with the incident cards 324, view resources associated with the security system 100 at respective locations displayed on the map, modify incident cards 324 displayed on the map, delete incident cards 324 displayed on the map, assign resources to an incident card 324, create new incident cards 324 by interacting with the map, etc.).

In some examples, the map view portal application 628 is a software application that is stored locally in the memory 612 and/or the system 614. In such examples, the map view portal application 628 can perform one or more of the functions described herein with respect to the map view portal 318 locally on the security system computing device 108 without connecting to the security system portal 314.

In some examples, the map view portal application 628 is integrated with the security system portal application 624 and/or the task management portal application 626. In some examples, the map view portal application 628 can be implemented as a plug-in feature and/or an extension of the security system portal application 624. In such examples, the one or more functions described herein with respect to the map view portal application 628 and/or the map view portal 318 can also be performed using the security system portal application 624 and/or the security system portal 314. In some examples, the map view portal application 628 can be implemented as a plug-in feature and/or an extension of the task management portal application 626. In such examples, the one or more functions described herein with respect to the map view portal application 628 and/or the map view portal 318 can also be performed using the task management portal application 626 and/or the task management portal 316.

In operation, the map view portal application 628 can be used to retrieve map data 328 (e.g., from the portal server 106 and/or an external database) and display a map of an area associated with the security system 100. The map of the area associated with the security system 100 can be generated, for example, based on the map data 328. In some examples, the map view portal application 628 can connect to the map view portal 318, and the map view portal 318 can cause the display of the map of the area associated with the security system 100 on the display device 616 within a window of the map view portal application 628. As another example, the map view portal application 628 can be used to display a map of the area surrounding the security system 100 that was retrieved from an external database.

Figure 11A:
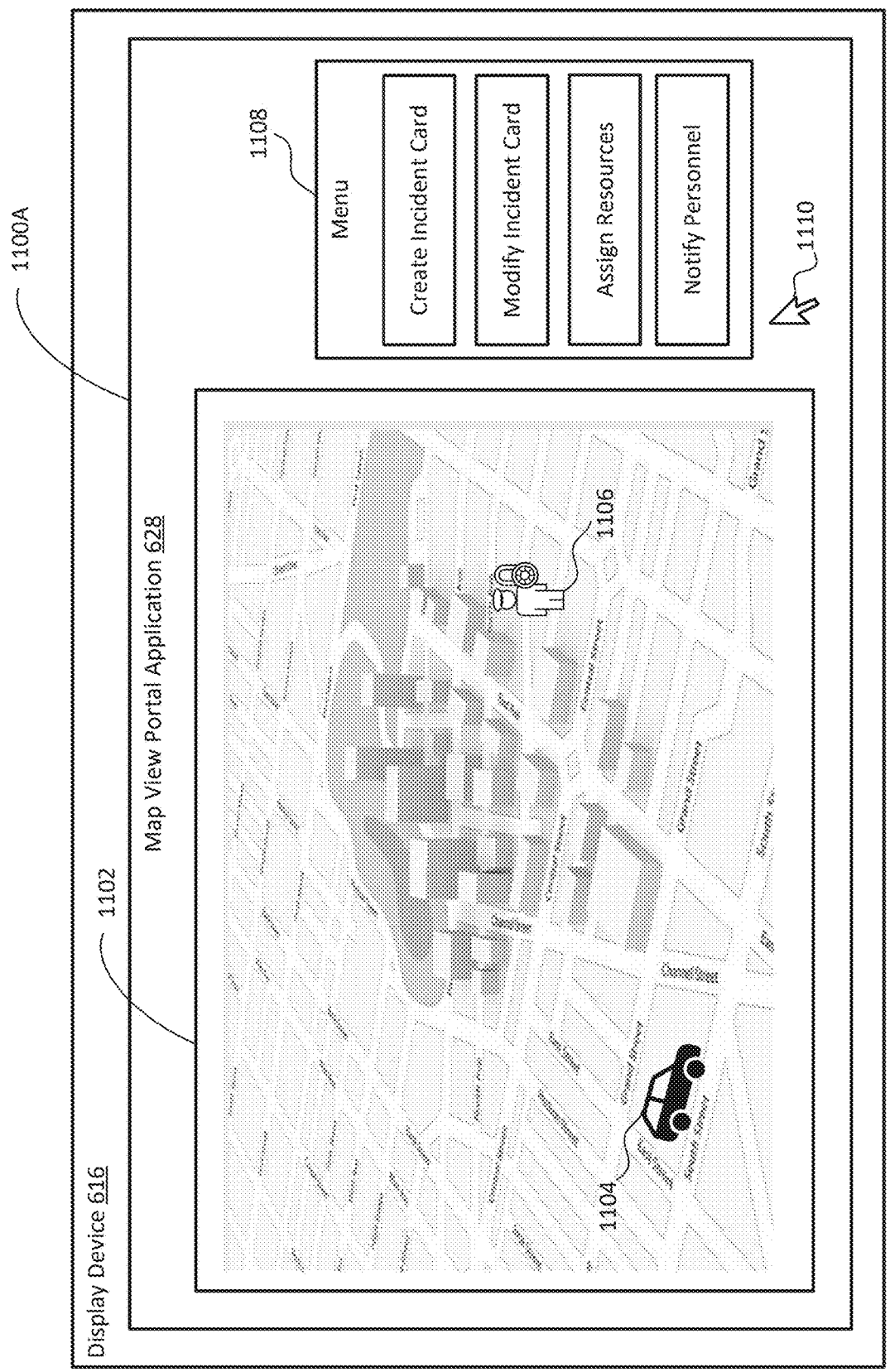
FIG. 11A illustrates an example window that is presented to a user for viewing a map, according to the present teachings.

FIG. 11A illustrates an example window that is presented to a user for viewing a map, according to the present teachings. For example, FIG. 11A illustrates an example window 1100A of the map view portal application 628 that is displayed on the display device 616 of the security system computing device 108. As shown in FIG. 11A, the window 1100A displays the map 1102 of an area associated with the security system 100. In the illustrated example of FIG. 11A, the map 1102 includes one or more buildings, streets, and/or resources associated with the security system 100.

For example, the map 1102 includes a first resource 1104 (e.g., a first responder vehicle such as an ambulance) that is displayed at a first location on the map 1102 that corresponds to the real-world location of the first resource 1104. As another example, the map 1102 includes a second resource 1106 (e.g., a first responder such as a security guard) that is displayed at a second location on the map 1102 that corresponds to the real-world location of the second resource 1106. In some examples, the map view portal 318 and/or the map view portal application 628 can retrieve location information associated with the resources from an external computing system (e.g., a computer-aided dispatch system, a 9-1-1 call center system, a first responder database, etc.). In other examples, the map view portal 318 and/or the map view portal application 628 can retrieve location information associated with the resources from a computing device included in the computing system 102 (e.g., the portal server 106, the security system computing device 108, and/or the task management computing device 110).

In addition, the window 1100A displays a menu 1108 that includes a plurality of selectable options for performing one or more actions associated with the map 1102 displayed within the window 1100A. For example, the menu 1108 includes an option for creating an incident card, an option for modifying an incident card, an option for assigning resources to an incident card, and an option for notifying one or more personnel regarding an incident and/or other event that has occurred. Using a cursor 1110, the user can select an option from the menu 1108 and/or interact with the map 1102 within the window 1100A. For example, a user can create a new incident card 324 by using the cursor 1110 to select the "Create Incident Card" option. Similarly, the user can modify an existing incident card 324 by using the cursor 1110 to select the "Modify Incident Card" option. Moreover, a user can assign resources to an incident card 324 by using the cursor 1110 to select the "Assign Resources" option or notify personnel of the occurrence of an incident and/or an event by using the cursor 1110 to select the "Notify Personnel" option.

Figure 11B:
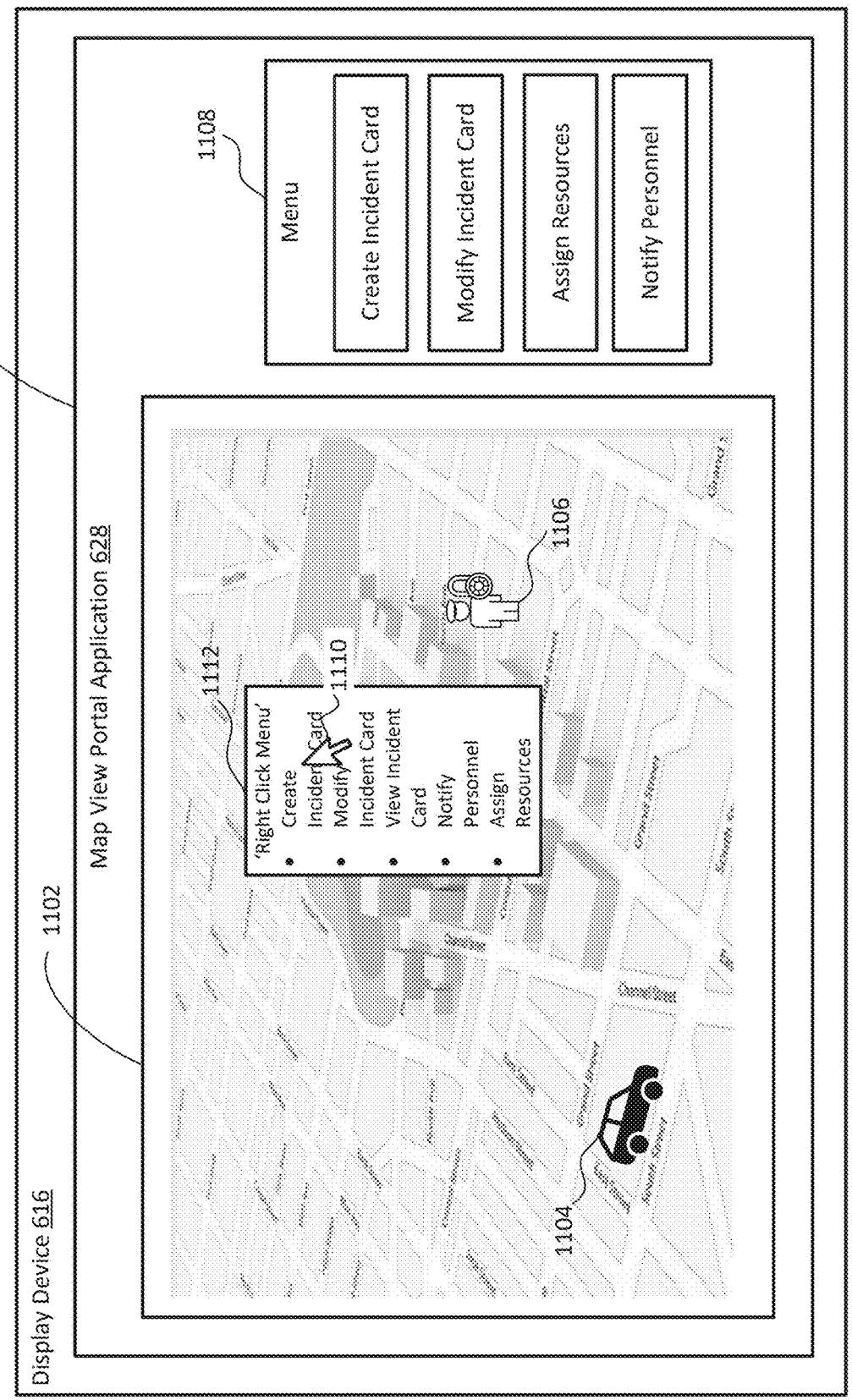
FIG. 11B illustrates an example prompt that is presented to a user interacting with a map, according to the present teachings.

In some examples, a user can also use the cursor 1110 to hover over and/or click on the map 1102 to perform one or more options associated with the map 1102. FIG. 11B illustrates an example prompt that is presented to a user interacting with a map, according to the present teachings. For example, FIG. 11B illustrates an example window 1100B of the map view portal application 628 in which a prompt window 1112 is presented to a user in response to the map view portal application 628 detecting user interaction with the map 1102 displayed within the window 1100B. User interaction can include, for example, clicking on the map 1102 with the cursor 1110, hovering over the map 1102 with the cursor 1110, or some other user interaction with the interactive map 1110.

As shown in FIG. 11B, the prompt window 1112 provides a list of options for a user interacting with the map 1102 displayed within window 1100B. The list of options provided by the prompt window 1112 includes, for example, a create incident card option, a modify incident card option, a view incident card option, a notify personnel option, and an assign resources option. As described herein, when an incident card 324 is modified and/or created using the map view portal 318 and/or the map view portal application 628 (e.g., via the menu 1108 or the prompt window 1112), the modification and/or creation of the incident card 324 is synchronized with the security system portal 314 and/or the task management portal 316.

Figure 11C:
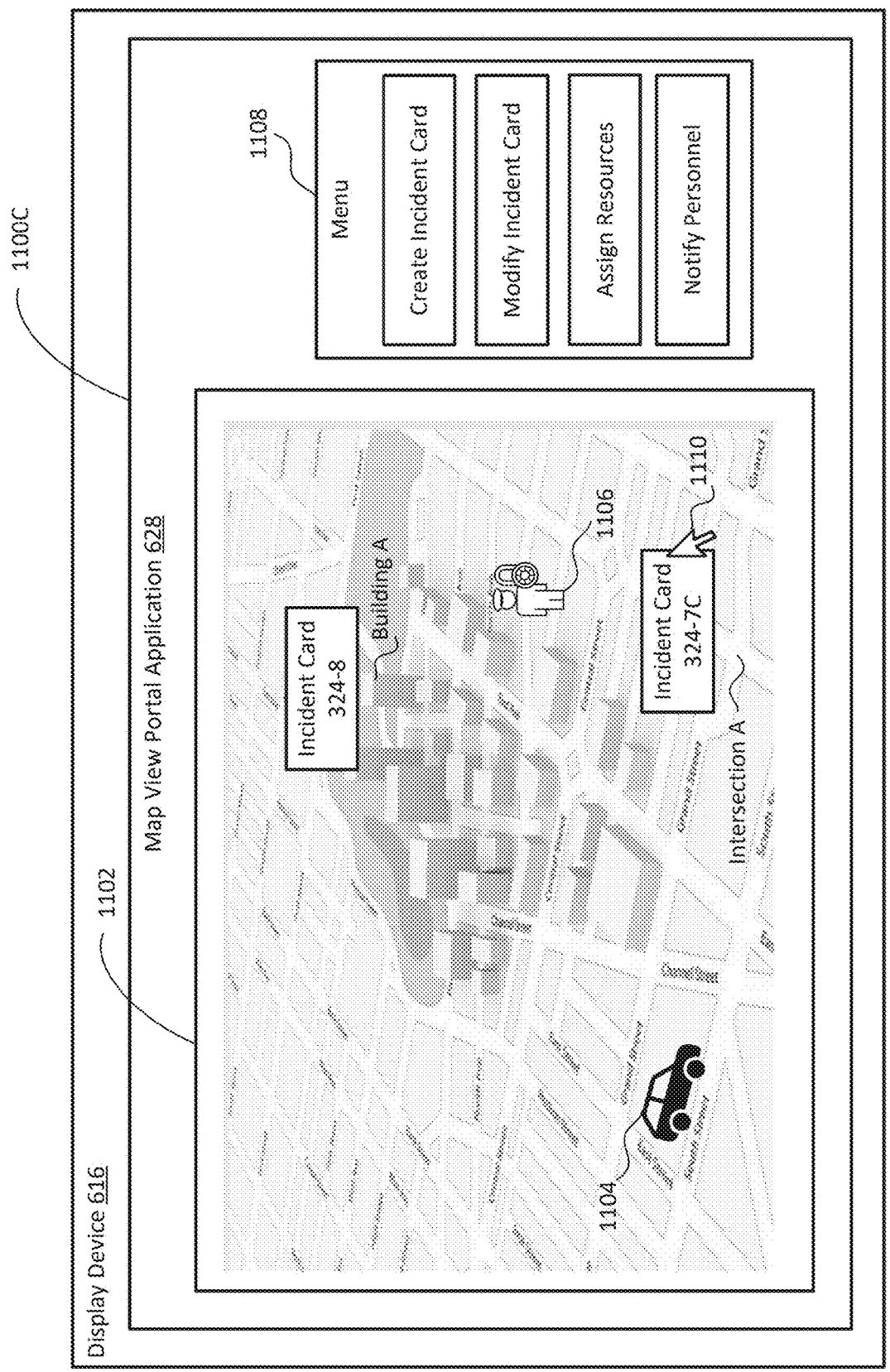
FIG. 11C illustrates an example window that is presented to a user for viewing one or more incident cards displayed on a map, according to the present teachings.

As further described herein, the map view portal 318 can cause the display an incident card 324 on the map 1102 at a location that corresponds to the real-world location of the incident associated with the incident card 324. FIG. 11C illustrates an example window that is presented to a user for viewing one or more incident cards displayed a map, according to the present teachings. For example, FIG. 11C illustrates an example window 1100C of the map view portal application 628 that is displayed on the display device 616 of the security system computing device 108. As shown in FIG. 11C, the incident card 324-8 is displayed on the map 1102 at a location corresponding to Building A. As described herein and shown in FIG. 9B, the task 404 described in incident card 324-8 includes replacing a damaged access control installed on a door in Room C of Building A. As further shown in FIG. 11C, the incident card 324-7C is displayed on the map 1102 at a location corresponding to Intersection A. As described herein and shown in FIG. 9D, the task 404 described in incident card 324-7C includes performing one or more actions in response to a car accident that occurred at Intersection A.

In some examples, incident cards 324 may be displayed on the map 1102 with different characteristics and/or visual effects (e.g., icons, colors, highlighting, flashing, etc.). For example, an incident card 324 may be displayed on the map 1102 with a particular visual effect based on the urgency associated with the incident card 324 and/or the type of incident associated with the incident card 324. With respect to the illustrated example of FIG. 11C, the incident card 324-8 may be displayed on the map 1102 with a first visual effect (e.g., a first color) because the incident card 324-8 has a medium urgency and the incident card 324-7C may be displayed on the map 1102 with a different, second visual effect (e.g., flashing and/or a second color) because the incident card 324-7C is associated with a high urgency.

Figure 11D:
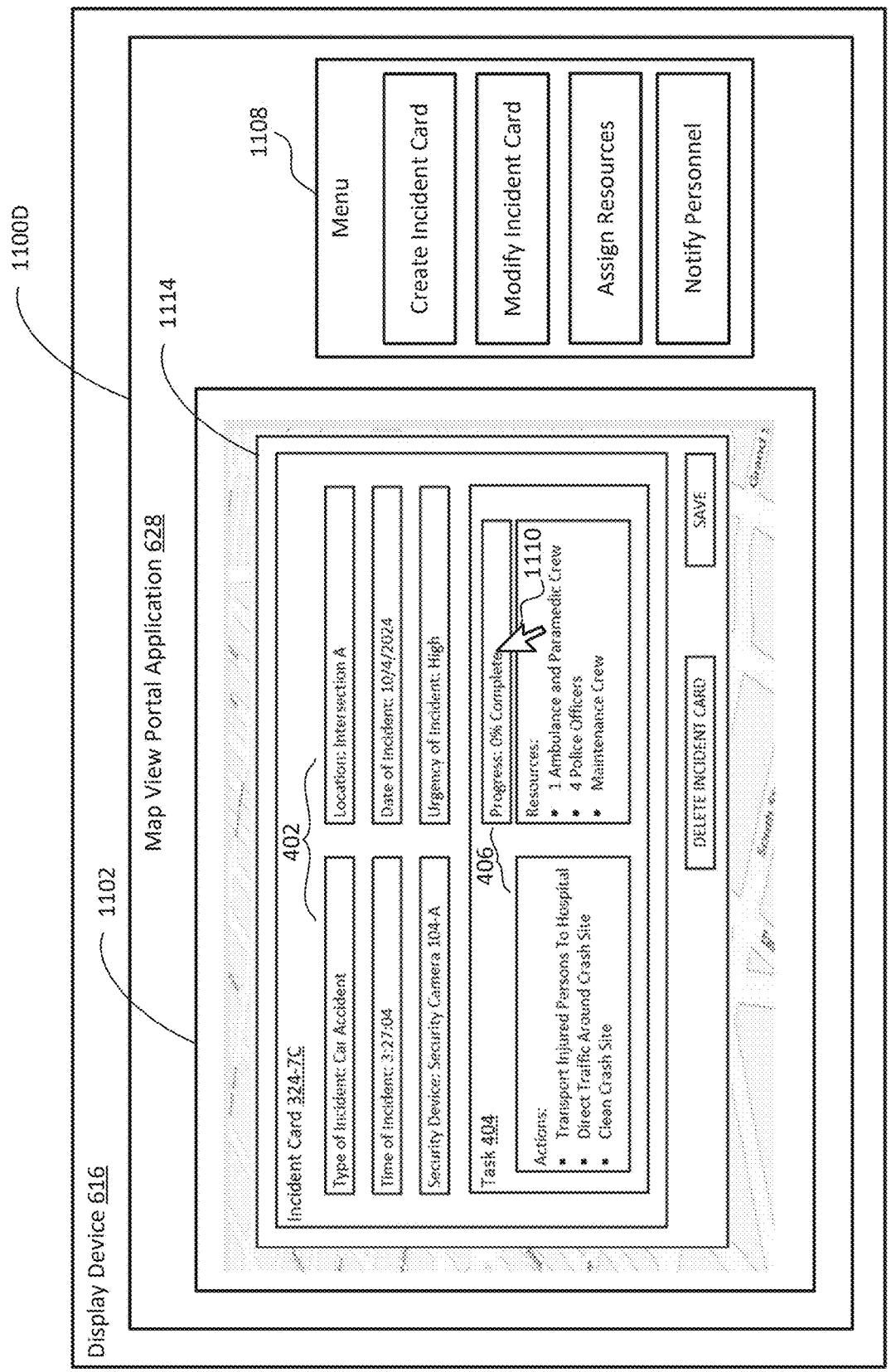
FIG. 11D illustrates an example window that is presented to a user for modifying an incident card displayed on a map, according to the present teachings.

While an incident card 324 is displayed on the map 1102, a user can select, with the cursor 1110, the incident card 324 displayed on the map 1102 to view and/or modify the information included in the incident card 324. For example, a user can select the incident card 324-7C displayed on the map 1102 to view and/or modify one or more of the information fields 402 and/or task fields 406 included in the incident card 324-7C. FIG. 11D illustrates an example window that is presented to a user for modifying an incident card displayed on a map, according to the present teachings. For example, FIG. 11D illustrates an example window 1100D of the map view portal application 628 that is displayed on the display device 616 of the security system computing device 108 after a user selects, using the cursor 1110, the incident card 324-7C displayed on the map 1102. As shown in FIG. 11D, an incident card modification window 1114 is overlayed on the map 1102. The incident card modification window 1114 allows users to delete the incident card 324-7C and/or modify one or more of the information fields 402 and/or the task fields 406 included in the incident card 324-7C from within the map view portal application 628. Importantly, any deletion of and/or modification to the incident card 324-7C using the incident card modification window 1114 is synchronized with the security system portal 314 and/or the task management portal 316.

As further described herein, when incident cards 324 are generated, modified, and/or deleted outside of the map view portal 318 and/or the map view portal application 628 (e.g., via the security system portal 314, the security system portal application 624, the task management portal 316, and/or the task management application 626), the generation, modification, and/or deletion of the incident cards 324 is synchronized with the map view portal 318 and can be reflected in real-time within the map 1102. In that regard, if a user of the task management portal application 626 and/or the security system portal application 624 modifies an information field 402 included in the incident card 324-7C while the incident card 324-7C is displayed on the map 1102, the display of the incident card 324-7C will be updated within the map 1102. For example, if a user of the task management portal application 626 and/or the security system portal application 624 modifies the location information field 402 included in the incident card 324-7C while the incident card 324-7C is displayed on the map 1102, the map view portal 318 will cause the display of the incident card 324-7C at a new location on the map 1102 that corresponds to the modified location information field 402.

Moreover, if a user of the task management portal application 626 and/or the security system portal application 624 deletes an incident card 324 while the incident card 324 is displayed on the map 1102, the map view portal 318 will cause the map view portal application 628 to stop displaying the incident card 324 on the map 1102 (e.g., delete the incident card 324 from the map 1102). In some examples, the map view portal 318 causes the map view portal application 628 to stop displaying the incident card 324 on the map 1102 immediately upon deletion of the incident card 324. In other examples, the map view portal 318 causes the map view portal application 628 to stop displaying the incident card 324 on the map 1102 sometime after (e.g., a few seconds after, a few minutes after, etc.) deletion of the incident card 324.

Figure 11E:
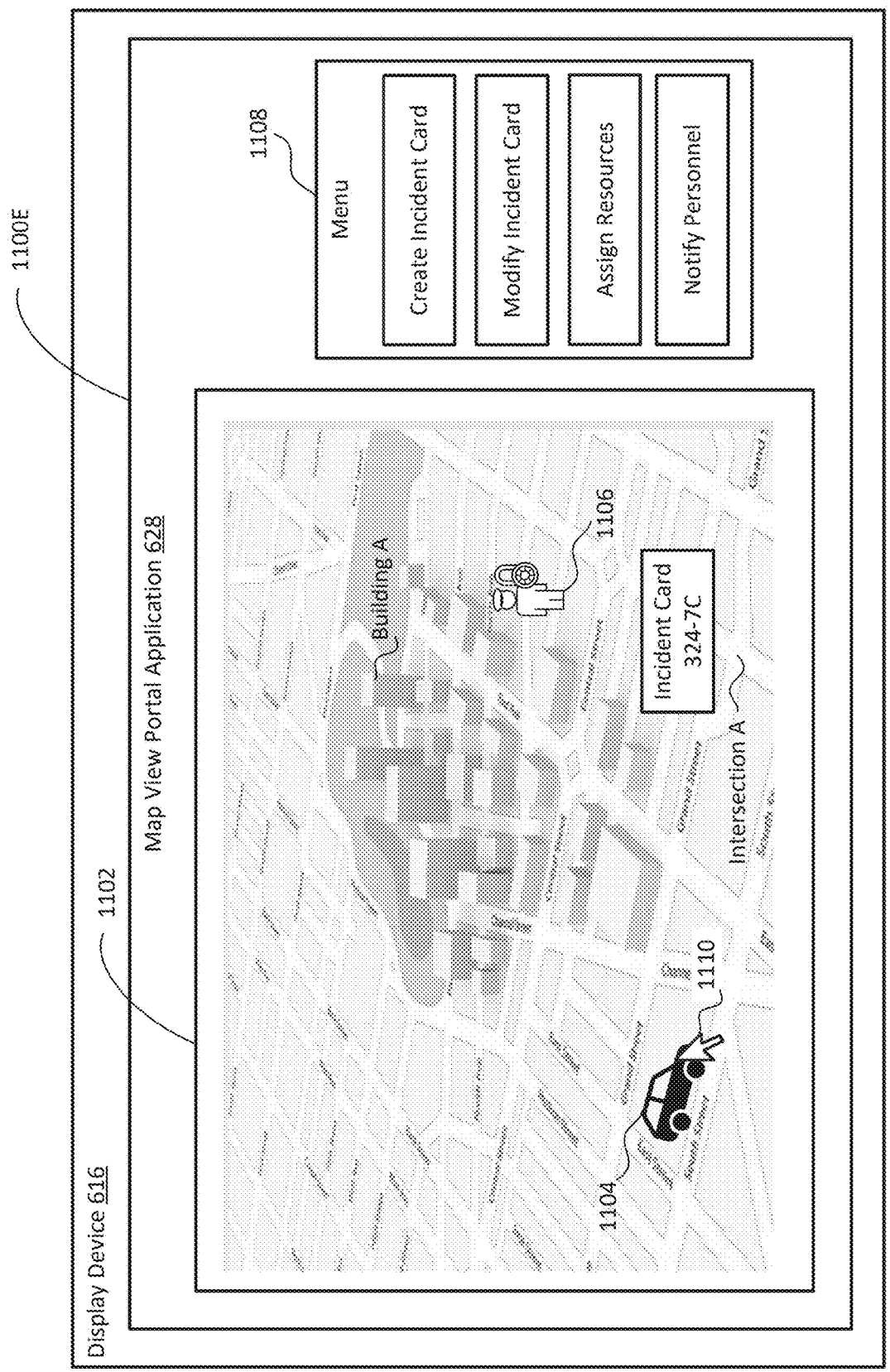
FIG. 11E illustrates an example window that is presented to a user after an incident card is removed from a map, according to the present teachings.

As described herein with respect to the illustrated example of FIG. 9B, the incident card 324-8 is deleted by a user of the task management portal application 626 after completion of the task 404 described in the incident card 324-8 (e.g., replacing the damaged access control installed on the door in Room C of Building A). In that regard, if the incident card 324-8 was displayed within the map 1102 using the map view portal 318 and/or the map view portal application 626 while the user of the task management portal application 626 deleted the incident card 324-8, the map view portal 318 would cause the map view portal application 628 to stop displaying the incident card 324-8 on the interactive map. FIG. 11E illustrates an example window that is presented to a user after a deleted incident card is removed from a map, according to the present teachings. For example, FIG. 11E illustrates an example window 1100E of the map view portal application 628 that is displayed on the display device 616 of the security system computing device 108 after the incident card 324-8 is deleted. When compared to the window 1100C shown in FIG. 11C, in the illustrated example of FIG. 11E, the incident card 324-8 is no longer displayed on the map 1102 near Building A.

With further reference to FIG. 11E, in some examples, users of the map view portal application 628 can assign resources displayed within the map 1102 to an incident card 324 displayed within the map 1102. For example, using the cursor 1110, a user can assign the first resource 1104 (e.g., a first responder vehicle such as an ambulance) and/or the second resource 1106 (e.g., a first responder such as a security guard) to the incident card 324-7C. When a resource is assigned to an incident card 324 displayed on the map 1102 using the map view portal application 628, the map view portal 318 synchronizes the assignment of the resource to the incident card 324 with the security system portal 314 and/or the task management portal 316. In some examples, the map view portal 318 and/or the map view portal application 628 can automatically assign a resource displayed on the map 1102 to an incident card 324 displayed on the map 1102 based on a proximity between the resource and the incident card 324.

Figure 12:
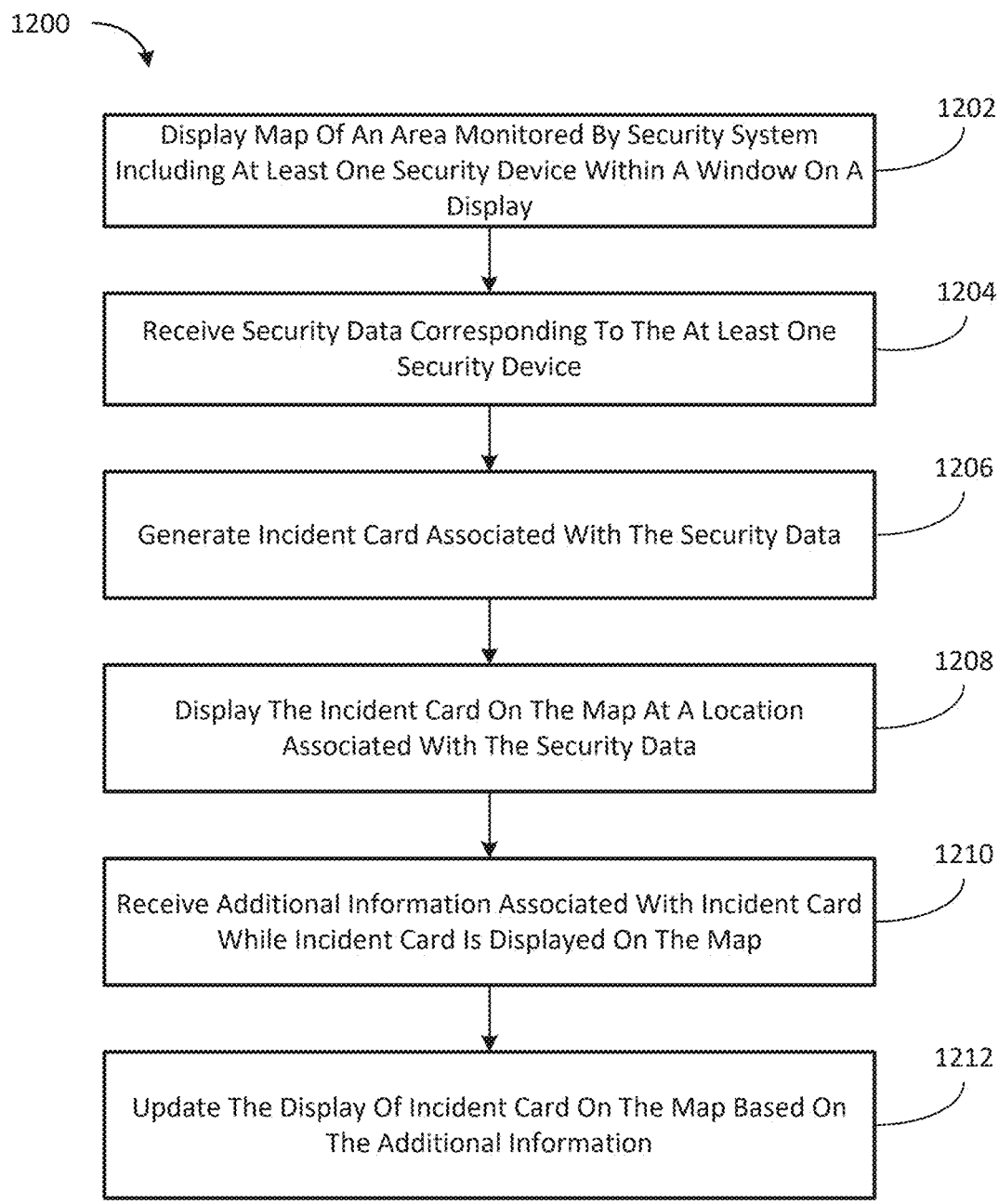
FIG. 12 is a flow diagram of method steps for using an interactive map to synchronize task management in a security system, according to the present teachings.

FIG. 12 is a flow diagram of method steps for using an interactive map to synchronize task management in a security system, according to the present teachings. Although the method steps are described with reference to the systems and processes of FIGS. 1-11E, persons skilled in the art will understand that any system adapted to implement the method steps, in any order, falls within the scope of the present invention.

As shown, a method 1200 begins at step 1202, where a map of an area monitored by a security system including at least one security device is displayed within a window on a display. For example, the computing system 102 causes display of the map 1102 within a window on a display device included in the computing system 102. In some examples, the portal server 106 causes display of the map 1102 within a window on the security system computing device 108 or the task management computing device 1110.

At step 1204, security data corresponding to the at least one security device is received. For example, the computing system 102 receives security data 322 generated by a security device 104. In some examples, portal server 106 receives the security data 322 generated by the security device 104.

At step 1206, an incident card associated with the security data is generated. For example, the computing system 102 generates an incident card 324 associated with the security data 322. In some examples, the portal server 106 generates the incident card 324. In some examples, the security system computing device 108 generates the incident card 324. In some examples, the task management computing device 110 generates the incident card 324.

At step 1208, the incident card is displayed on the map at a location associated with the security data. For example, the computing system 102 causes display of the incident card 324 at a location on the map 1102 that corresponds to the location at which the security data 322 was generated. In some examples, the portal server 106 causes display of the incident card 324 at a location on the map 1102 that is displayed within the window on the security system computing device 108 or the task management computing device 110.

At step 1210, additional information associated with the incident card is received while the incident card is displayed on the map. For example, the computing system 102 receives additional information associated with the incident card 324 while the incident card 324 is displayed on the map 1102. In some examples, the security system computing device 108 and/or the task management computing device 110 receive the additional information in the form of a user input.

At step 1212, the display of the incident card on the map is updated based on the additional information. For example, computing system 102 causes the display of the incident card 324 on the map 1102 to update based on the additional information associated with the incident card 324. In some examples, the portal server 106 causes the display of the incident card 324 to update within the window on the security system computing device 108 or the task management computing device 110.

Figure 13:
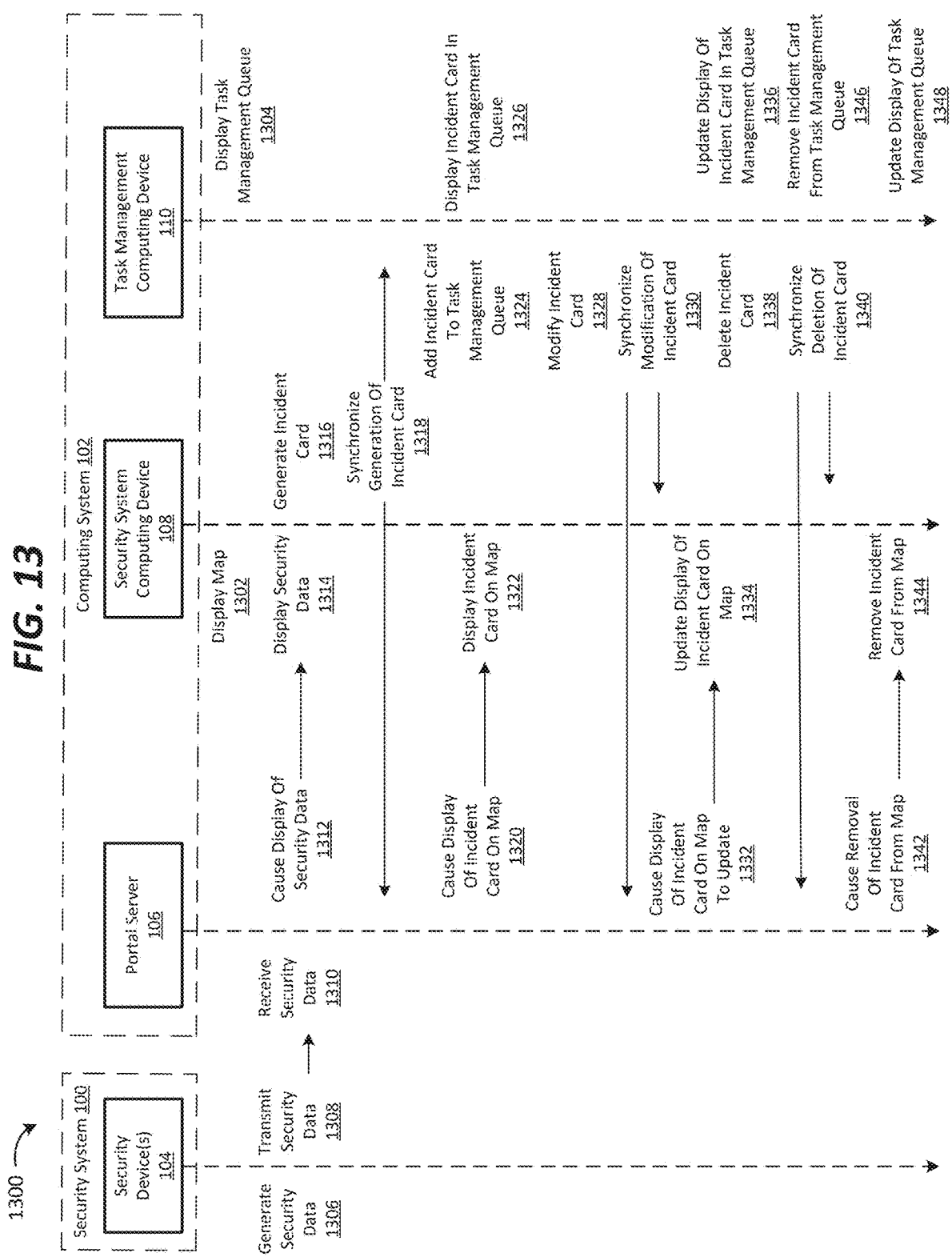
FIG. 13 illustrates an example flow diagram of a process for synchronizing task management in a security system, according to the present teachings.

FIG. 13 illustrates an example flow diagram of a process 1300 for synchronizing task management in a security system, according to the present teachings. Although the interaction between the devices in process 1300 are shown in an order, persons skilled in the art will understand that the interactions may be performed in a different order, interactions may be repeated or skipped, and/or may be performed by components other than those described in FIG. 13. Moreover, the process 1300 may include additional interactions and/or steps that are not explicitly shown and/or described herein.

In the illustrated example of FIG. 13, the computing system 102 is shown as including a portal server 106, a security system computing device 108, and a task management computing device 110. However, persons skilled in the art will understand that, in some examples, the computing system 102 can include more or fewer computing devices. Moreover, persons skilled in the art will understand that, in some examples, one or more actions described as being performed by one computing device in the process 1300 may alternatively performed by a different computing device.

Furthermore, in the illustrated example of FIG. 13, the security system 100 is shown as including only one security device 104 connected to the computing system 102. However, persons skilled in the art will understand that the security system 100 can include any number of security devices 104 connected to the computing system 102. In some examples, the process 1300 can be implemented by a task management system that does not include and/or is not coupled to security device(s) 104. In such examples, the security device(s) 104 may be replaced with one or more other devices that generate telemetry data, operational data, management data, administrative data, and/or other types of data associated with an organization.

Process 1300 begins at step 1302 at which the security system computing device 1302 displays a map 1102 of an area associated with the security system 100 in a first window on the display device 616. In some examples, the portal server 106 causes the security system computing device 108 to display the map 1102.

At step 1304, the task management computing device 110 displays a task management queue 326 in a window on the display device 816. In some examples, the portal server 106 causes the task management computing device 110 to display the task management queue 326.

At step 1306, the security device 104 generates security data 322. For example, the security device 104 is a video camera that generates video content. At step 1308, the security device 104 transmits the security data 322 to the portal server 106.

At step 1310, the portal server 106 receives the security data 322. At step 1312, the portal server 106 causes display of the security data 322 on the security system computing device 108.

At step 1314, the security system computing device 108 displays the security data 322. For example, the security system computing device 108 displays the security data 322 within a second window on the display device 616.

At step 1316, the security system computing device 108 generates an incident card 324 associated with the security data 322. In some examples, the security system computing device 108 generates the incident card 324 automatically in response to detecting an occurrence of an incident in the security data 322. In some examples, the security system computing device 108 generates the incident card 324 in response to receiving a user input to generate an incident card 324 associated with an incident that occurred in the security data 322. At step 1318, the security system computing device 108 synchronizes the generation of the incident card 324 with the portal server 106 and/or the task management computing device 110.

At step 1320, the portal server 106 causes display of the incident card 324 on the map 1102 displayed on the security system computing device 108. At step 1322, the security system computing device 108 displays the incident card 324 on the map 1102 that is displayed within the first window on display device 616. For example, the security system computing device 108 displays the incident card 1322 at a location on the map 1102 that corresponds to the security data 322.

At step 1324, the task management computing device 110 adds incident card 324 to the task management queue 326. At step 1326, the task management computing device 110 displays the incident card 324 within the task management queue 326 that is already displayed within the window displayed on the display device 816.

At step 1328, the task management computing device 110 modifies the incident card 324. For example, the task management computing device 110 modifies, either automatically or in response to user input, one or more information fields 402 and/or task fields 406 included in the incident card 324. At step 1330, the task management computing device 110 synchronizes the modification of the incident card 324 with the portal server 106 and/or the security system computing device 108.

At step 1332, the portal server 106 causes display of the incident card 324 within the map 1102 on the security system computing device 108 to update based on the modification to the incident card 324. At step 1334, the security system computing device 108 updates the display of the incident card 324 within the map 1102 based on the modification to the incident card 324.

At step 1336, the task management computing device 1336 updates the display of the incident card 324 within the task management queue 326 based on the modification of the incident card 324. For example, the task management computing device 110 changes the position within the task management queue 326 at which the incident card 324 is displayed based on the modification to the incident card 324.

At step 1338, the task management computing device 110 deletes the incident card 324. For example, the task management computing device 110 deletes, automatically or in response to user input, the incident card 324 when the task 404 described in the incident card 324 is completed. At step 1340, the task management computing device 110 synchronizes the deletion of the incident card 324 with the portal server 106 and/or the security system computing device 108.

At step 1342, the portal server 106 causes removal of the incident card 324 displayed within the map 1102 on the security system computing device 108. At step 1344, the security system computing device 108 removes the incident card 324 from the map 1102 displayed within the first window on the display device 616.

At step 1346, the task management computing device 110 removes the incident card 324 from the task management queue 326. At step 1348, the task management computing device 110 updates the display of the task management queue 326 to no longer include the incident card 324.

Figure 14:
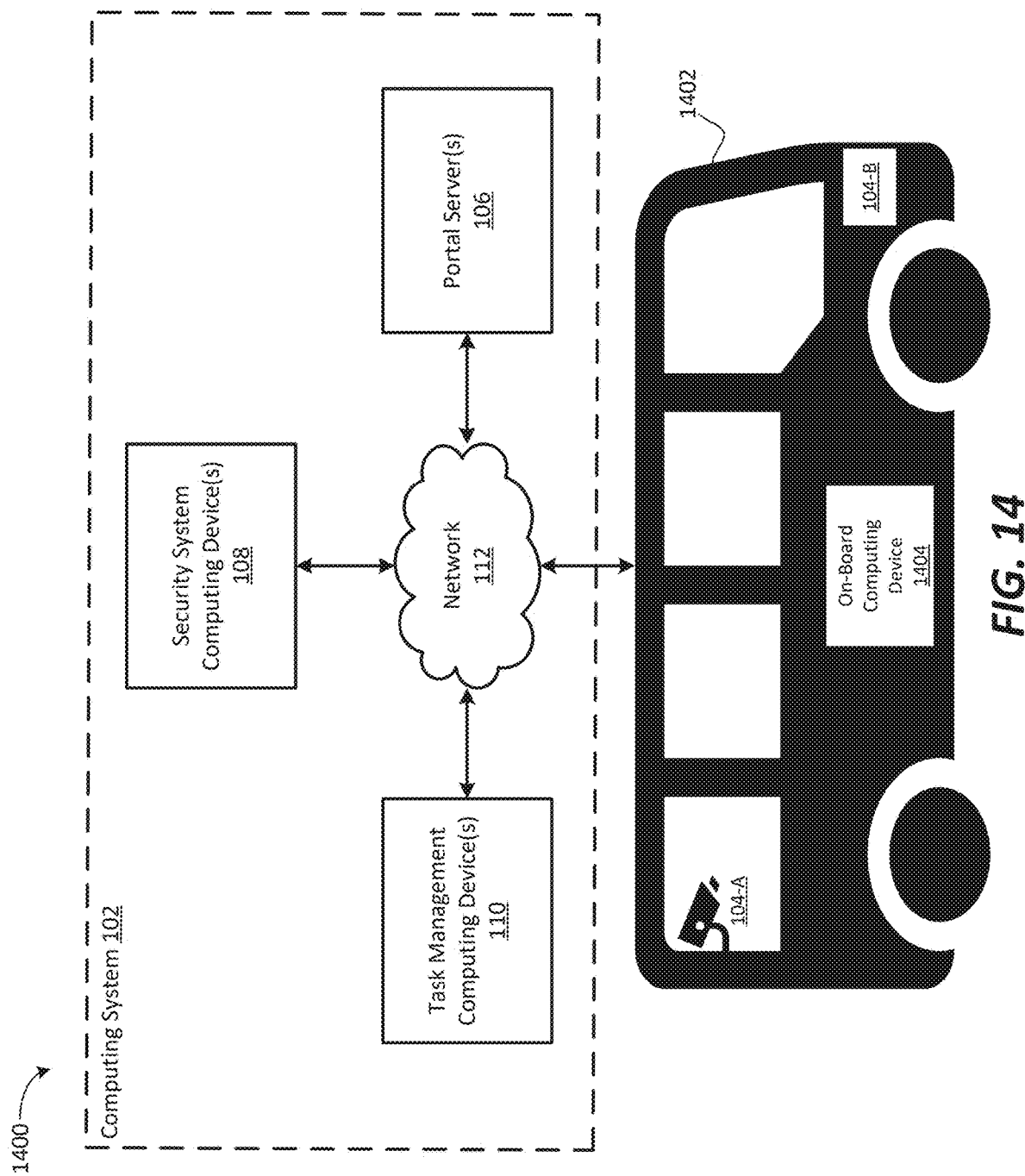
FIG. 14 is an illustration of an example task management system, according to the present teachings.

FIG. 14 is an illustration of an example task management system 1400, according to the present teachings. The task management system 1400 is similar to the security system 100 described herein. For example, the task management system 1400 includes the computing system 102 described herein with respect to FIGS. 1-13.

As further shown in FIG. 14, the task management system 1400 includes a fleet vehicle 1402. The fleet vehicle 1402 can be implemented as, for example, a bus, a truck, a car, a first responder vehicle, or some other type of vehicle. The fleet vehicle 1402 includes an on-board computing device 1404 that is coupled to the computing system 102 via the network 112. In some examples, the on-board computing device 1404 is similar in construction and/or operation to the security system computing device 108 and/or the task management computing device 110.

As further shown in FIG. 14, the fleet vehicle 1402 includes a plurality of on-board security devices 104 that are connected to the on-board computing device 1404. For example, the fleet vehicle 1402 includes a first security device 104-A (e.g., a camera) and a second security device 104-B (e.g., a collision sensor) that generate security data in operation of the fleet vehicle 1402. In some examples, the fleet vehicle 1402 includes more on-board security devices 104 and/or different types of on-board security devices 104.

In operation of the fleet vehicle 1402, the on-board computing device 1404 receives the security data generated by the on-board security devices 104 (which, in some embodiments, may include information generated by sensors, diagnostic equipment, or the like, associated with the fleet vehicle 1402, which may be in communication with one or more of the first and second security device 104-A and 104-B). The on-board computing device 1404 is adapted to monitor, or analyze, the received security data for the occurrence of an incident. In response to detecting the occurrence of an incident associated with the security data, the on-board computing device 1404 can automatically generate an incident card 324 associated with the incident and transmit the incident card 324 to the computing system 102. In that regard, the computing system 102 can manage and/or use the incident card received from the fleet vehicle 1404 in accordance with the techniques described herein with respect to FIGS. 1-13.

In one example, the on-board computing device 1404 determines that an altercation involving passengers on the fleet vehicle 1402 has occurred based on the security data received from the first on-board security device 104-A. In this examples, the on-board computing device 1404 generates an incident card 324 associated with the altercation involving passengers on the fleet vehicle 1402 and transmits the incident card 324 to the computing system 102. In another example, the on-board computing device 1404 determines that a collision involving the fleet vehicle 1402 has occurred based on the security data received from the second on-board security device 104-B. In this example, the on-board computing device 1404 generates an incident card 324 associated with the collision involving the fleet vehicle 1402 and transmits the incident card 324 to the computing system 102.

1. In some embodiments, a security system managing at least one security device adapted to generate security data comprises a computing system. The computing system adapted to receive security data corresponding to the at least one security device, cause display of the security data within a first window on a first display, detect a user interaction with the security data displayed within the first window, generate an incident card in response to detecting the user interaction, add the incident card to a task management queue, and cause display of the incident card within the task management queue, the task management queue displayed within at least one of a second window on the first display or a third window on a second display.

2. The security system of clause 1, wherein the incident card describes a task to be performed by one or more personnel in response to an incident associated with the security data, the task describing a location where one or more actions are to be performed and one or more resources used to perform the one or more actions; and the task management queue stores a plurality of incident cards, each incident card in the plurality of incident cards stored in the task management queue corresponding to a respective task that has yet to be performed.

3. The security system of clauses 1 or 2, wherein the incident card includes at least one of information that identifies the at least one security device, a timestamp associated with the security data, or a location associated with the security data.

4. The security system of any of clauses 1-3, wherein the computing system is adapted to prompt a user to input additional information associated with the security data in response to generating the incident card; and the computing system is adapted to add the additional information to the incident card.

5. The security system of any of clauses 1-4, wherein the additional information includes an urgency associated with the security data; and the computing system is adapted to rank the incident card in the task management queue based on the urgency.

6. The security system of any of clauses 1-5, wherein the at least one security device comprises a video camera; and the security data includes video data generated by the at least one security device.

7. The security system of any of clauses 1-6, wherein the computing system includes a plurality of processors in electronic communication with each other via a network; and a plurality of displays coupled to the plurality of processors.

8. The security system of any of clauses 1-7, wherein the user interaction includes at least one of a cursor selection of the security data, a voice command, or a hand gesture directed at the security data.

9. The security system of any of clauses 1-8, wherein the computing system includes a first software application used for monitoring operation of a plurality of security devices connected to the security system, the first software application generating the incident card; the computing system includes a second software application used for managing tasks included in incident cards associated with the security system, the second software application adding the incident card to the task management queue; and the first software application interacts with the second software application via an application programmable interface.

10. In some embodiments, a security system managing at least one security device adapted to generate security data comprises a first computing system and a second computing system in electronic communication with the first computing system. The first computing system including a first processor and a display with a user interface, the second computing system including a second processor. The first computing system adapted to receive security data corresponding to the at least one security device, display the security data within a user interface on the display, detect a user interaction with the security data displayed within the user interface, generate an incident card in response to detecting the user interaction with the security data, populate the incident card with first information associated with the security data, prompt a user to input second information associated with the security data, populate the incident card with the second information in response to receiving the second information from the user, and transmit the incident card to the second computing system. The second computing system adapted to receive the incident card and add the incident card to a task management queue.

11. The security system of clause 10, wherein the at least one security device comprises a video camera; the security data comprises video content that was generated by the at least one security device; the incident card describes a task to be performed by one or more personnel in response to an incident associated with the security data; and the second information identifies the one or more personnel and an urgency of the incident associated with the security data.

12. The security system of clauses 10 or 11, wherein the second information includes a type of an incident associated with the security data and an urgency of the incident associated with the security data.

13. The security system of any of clauses 10-12, wherein the second computing system is adapted to add the incident card to the task management queue based on at least one of the type of the incident associated with the security data or the urgency of the incident associated with the security data.

14. The security system of any of clauses 10-13, wherein the second computing system is adapted to assign the incident card to a first resource based on at least one of the type of the incident associated with the security data or the urgency of the incident associated with the security data.

15. The security system of any of clauses 10-14, wherein to assign the incident card to the first resource, the second computing system is adapted to transmit a message that includes the incident card to third computing system associated with the first resource.

16. The security system of any of clauses 10-15, wherein the first computing system includes a first processor adapted to execute a first software application; and wherein the second computing system includes a second processor adapted to execute a second software application.

17. The security system of any of clauses 10-16, wherein the second computing system is adapted to update the incident card with third information, the third information indicating an amount of progress made towards resolving the incident associated with the security data; and the first computing system is adapted to display the third information included in the incident card within the user interface on the display.

18. The security system of any of clauses 10-17, wherein the task management queue comprises a first task management queue; and to add the incident card to the first task management queue, the second computing system is adapted to add the incident card to the first task management queue instead of a second task management queue based at least in part on the first information and the second information.

19. In some embodiments, a security system comprising a security camera adapted to generate video content and a computing system in electronic communication with the security camera via a network. The computing system adapted to receive the video content generated by the security camera, display the video content within a user interface on a display, receive a request to generate an incident card associated with the video content while the video content is displayed within the user interface, generate an incident card based on the request to generate the incident card, and populate the incident card in a task management platform.

20. The security system of clause 19, wherein the incident card identifies a public safety incident associated with the video content.

21. The security system of clauses 19 or 20, wherein the incident card identifies one or more resources assigned to respond to the public safety incident 22. The security system of any of clauses 19-21, wherein the incident card identifies an urgency associated with the public safety incident.

23. In some embodiments, a security system managing at least one security device adapted to generate security data comprises a computing system. The computing system adapted to receive security data corresponding to the at least one security device, detect an occurrence of an event associated with the security data, generate an incident card in response to detecting the occurrence of the event, the incident card describing a task to be performed by one or more personnel, add the incident card to a task management queue, and cause display of the incident card within the task management queue within a window on a display.

24. The security system of clause 23, wherein the task describes a location where one or more actions are to be performed and one or more resources used to perform the one or more actions; and the task management queue stores a plurality of incident cards, each incident card in the plurality of incident cards stored in the task management queue corresponding to a respective task that has yet to be performed.

25. The security system of clauses 23 or 24, wherein the event associated with the security data includes at least one of an emergency phone call, a collision involving a vehicle, an altercation involving one or more persons, or a presence of a safety hazard.

26. The security system of any of clauses 23-25, wherein the computing system is adapted to cause display of the security data within a second window on the display; wherein to detect the occurrence of the event associated with the security data, the computing system is adapted to detect a user interaction with the security displayed within the second window; and the computing system adapted to generate the incident card in response to detecting the user interaction.

27. In some embodiments, a security system managing at least one security device adapted to generate security data comprises a computing system. The computing system adapted to display a map of an area monitored by the security system within a window on a display, receive security data corresponding to the at least one security device, generate an incident card associated with the security data, the incident card including information that describes a task to be performed in response to an incident associated with the security data, display the incident card on the map at a location associated with the security data, receive additional information associated with the incident card while the incident card is displayed on the map at the location associated with the security data, and update the display of the incident card on the map based on the additional information associated with the incident card.

28. The security system of clause 27, wherein the additional information includes at least one of a type of the incident associated with the security data, an urgency of the incident associated with the security data, or an amount of progress made towards completing the task; and wherein to update the display of the incident card on the map, the computing system is adapted to display the additional information in a second window that overlays the map.

29. The security system of clauses 27 or 28, wherein the additional information includes an indication that the task has been completed; and wherein to update the display of the incident card on the map, the computing system is adapted to remove the incident card from the map after the task has been completed. 30. The security system of any of clauses 27-29, wherein the task describes a location where one or more actions are to be performed and one or more resources to be used to perform the one or more actions, the resources including at least one of personnel or equipment.

31. The security system of any of clauses 27-30, wherein the computing system is adapted to detect a user interaction with the incident card displayed on the map; and responsive to detecting the user interaction, the computing system is adapted to display the additional information associated with the incident card in a second window that overlays the map.

32. The security system of any of clauses 27-31, wherein the computing system is adapted to display a resource associated with the security system on the map at a second location; and wherein the resource is at least one of a person, a vehicle, or a replacement security device.

33. The security system of any of clauses 27-32, wherein the computing system is adapted to detect a user interaction with at least one of the incident card displayed on the map or the resource displayed on the map; and responsive to detecting the user interaction, the computing system is adapted to assign the resource to the incident card.

34. The security system of any of clauses 27-33, wherein the computing system is adapted to automatically assign the resource to the incident card based on at least one of a type of the incident associated with the security data or a proximity of the second location on the map at which the resource is displayed to the location on the map at which the incident card is displayed.

35. The security system of any of clauses 27-34, wherein the computing system is adapted to transmit the incident card to a second computing system associated with the resource in response to assigning the resource to the incident card.

36. The security system of any of clauses 27-35, wherein the at least one security device comprises a video camera; and the security data includes video data generated by the at least one security device.

37. The security system of any of clauses 27-36, wherein the computing system includes a plurality of processors in electronic communication with each other via a network; and a plurality of displays, each in electronic communication with an associated one of the plurality of processors.

38. In some embodiments, a computing system comprising a first computing system including a first processor and a first display. The computing system further comprising a second computing system in electronic communication with the first computing system, the second computing system including a second processor and a second display. The first computing system adapted to receive data from an external system, generate an incident card associated with the data, the incident card including information that describes a task to be performed in response to an incident associated with the data, and cause display of the incident card within a first window on the first display. The second computing system adapted to display a map of an area associated with the computing system within a second window on the second display, display the incident card on the map at a location associated with the data, receive additional information associated with the incident card while the incident card is displayed on the map at the location associated with the data, and update the display of the incident card on the map based on the additional information associated with the incident card.

39. The computing system of clause 38, wherein the first computing system is adapted to update the display of the incident card within the first window based on the additional information associated with the incident card.

40. The computing system of clauses 38 or 39, wherein the first computing system is adapted to add the incident card to a task management queue; and wherein to cause display of the incident card within the first window, the first computing system is adapted to cause display of the incident card within the task management queue.

41. The computing system of any of clauses 38-40, wherein the first computing system is adapted to cause display of the data within the first window on the first display; and wherein to cause display of the incident card within the first window, the first computing system is adapted to cause the incident card to overlay the display of the data within the first window.

42. The computing system of any of clauses 38-41, wherein the first computing system is adapted to receive a user input indicating the task has been completed; and responsive to receiving the user input, the first computing system is adapted to cause removal of the incident card from the first window.

43. The computing system of any of clauses 38-42, wherein the first computing system is adapted to assign a resource to the incident card, the resource including at least one of a person, a vehicle, or a piece of equipment; and the second computing system is adapted to display the resource on the map at a second location associated with the resource.

44. The computing system of any of clauses 38-43, wherein the external system is a security system comprising at least one security device; and wherein the data includes security data generated by the at least one security device.

45. The computing system of any of clauses 38-44, wherein the external system is a computer-aided dispatch system.

46. The computing system of any of clauses 38-45, wherein the external system is a 9-1-1 call center.

47. In some embodiments, a task management system for managing tasks associated with at least one resource comprising a first computing system and a second computing system in electronic communication with the first computing system. The first computing system including a first processor and the second computing system including a second processor and a display with a user interface. The first computing system adapted to receive data from at least one sensor associated with the resource, detect an occurrence of an incident based on the data, and generate an incident card in response to detecting the occurrence of the incident, the incident card including information that identifies at least one of a type of the incident, an urgency associated with the incident, or a time at which the incident occurred. The second computing system adapted to display a map of an area associated with task management system within the user interface on the display, display the incident card on the map at a first location associated with the data, and display the resource on the map at a second location associated with the resource.

48. The task management system of clause 47, wherein the second computing system is adapted to receive a user input that describes a task to be performed in response to the incident and add the task to the incident card.

49. The task management system of clauses 47 or 48, further comprising a third computing system in electronic communication with the first computing system and the second computing system, the third computing system including a third processor and a second display with a second user interface. The third computing system adapted to add the incident card to a task management queue, and cause display of the incident card in the task management queue within the second user interface on the second display.

50. The task management system of any of clauses 47-49, wherein the resource is a vehicle; and wherein the at least one sensor includes at least one of a security camera or a collision sensor.

51. The task management system of any of clauses 47-50, wherein the first computing system is an on-board computing system positioned within the vehicle.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A security system managing at least one security device adapted to generate security data, comprising:
   a computing system adapted to receive security data corresponding to the at least one security device;
   the computing system adapted to cause display of the security data within a first window on a first display;
   the computing system adapted to detect a user interaction with the security data displayed within the first window;
   the computing system adapted to generate an incident card in response to detecting the user interaction;
   the computing system adapted to add the incident card to a task management queue; and
   the computing system adapted to cause display of the incident card within the task management queue, the task management queue displayed within at least one of a second window on the first display or a third window on a second display.

2. The security system of claim 1, wherein:
   the incident card describes a task to be performed by one or more personnel in response to an incident associated with the security data, the task describing a location where one or more actions are to be performed and one or more resources used to perform the one or more actions; and
   the task management queue stores a plurality of incident cards, each incident card in the plurality of incident cards stored in the task management queue corresponding to a respective task that has yet to be performed.

3. The security system of claim 1, wherein the incident card includes at least one of information that identifies the at least one security device, a timestamp associated with the security data, or a location associated with the security data.

4. The security system of claim 1, wherein:
   the computing system is adapted to prompt a user to input additional information associated with the security data in response to generating the incident card; and the computing system is adapted to add the additional information to the incident card.

5. The security system of claim 4, wherein:
the additional information includes an urgency associated with the security data; and
the computing system is adapted to rank the incident card in the task management queue based on the urgency.

6. The security system of claim 1, wherein:
the at least one security device comprises a video camera; and
the security data includes video data generated by the at least one security device.

7. The security system of claim 1, wherein the computing system includes:
a plurality of processors in electronic communication with each other via a network; and
a plurality of displays coupled to the plurality of processors.

8. The security system of claim 1, wherein the user interaction includes at least one of a cursor selection of the security data, a voice command, or a hand gesture directed at the security data.

9. The security system of claim 1, wherein:
the computing system includes a first software application used for monitoring operation of a plurality of security devices connected to the security system, the first software application generating the incident card;
the computing system includes a second software application used for managing tasks included in incident cards associated with the security system, the second software application adding the incident card to the task management queue; and
the first software application interacts with the second software application via an application programmable interface.

10. The security system of claim 1, wherein the event associated with the security data includes at least one of an emergency phone call, a collision involving a vehicle, an altercation involving one or more persons, or a presence of a safety hazard.

11. The security system of claim 1, wherein the computing system is adapted to cause display of the security data within a second window on the display;
wherein to detect the occurrence of the event associated with the security data, the computing system is adapted to detect a user interaction with the security displayed within the second window; and
the computing system adapted to generate the incident card in response to detecting the user interaction.

12. A method for managing at least one security device adapted to generate security data, comprising:
receiving security data corresponding to the at least one security device;
causing display of the security data within a first window on a first display;
detecting a user interaction with the security data displayed within the first window;
generating an incident card in response to detecting the user interaction;
adding the incident card to a task management queue; and
causing display of the incident card within the task management queue, the task management queue displayed within at least one of a second window on the first display or a third window on a second display.

* * * * *